United States Patent
Tamaru et al.

(10) Patent No.: US 12,304,577 B2
(45) Date of Patent: May 20, 2025

(54) ROTATING MACHINE CONTROL DEVICE AND ELECTRIC POWER STEERING DEVICE

(71) Applicant: Mitsubishi Electric Corporation, Tokyo (JP)

(72) Inventors: Tomohiro Tamaru, Tokyo (JP); Tatsuya Mori, Tokyo (JP); Chiaki Fujimoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 51 days.

(21) Appl. No.: 18/269,682

(22) PCT Filed: Apr. 16, 2021

(86) PCT No.: PCT/JP2021/015673
§ 371 (c)(1),
(2) Date: Jun. 26, 2023

(87) PCT Pub. No.: WO2022/219794
PCT Pub. Date: Oct. 20, 2022

(65) Prior Publication Data
US 2024/0067258 A1 Feb. 29, 2024

(51) Int. Cl.
*B62D 5/04* (2006.01)
*H02P 21/22* (2016.01)
(Continued)

(52) U.S. Cl.
CPC ............ *B62D 5/0463* (2013.01); *H02P 21/22* (2016.02); *H02P 25/22* (2013.01); *H02P 27/08* (2013.01)

(58) Field of Classification Search
CPC ........ B62D 5/0463; B62D 5/046; B62D 5/04; H02P 21/22; H02P 25/22; H02P 27/08
See application file for complete search history.

(56) References Cited

U.S. PATENT DOCUMENTS 12,184,209 B2 * 12/2024 Suzuki .................... H02P 25/22
2019/0260324 A1    8/2019 Kuramitsu et al.
(Continued)

FOREIGN PATENT DOCUMENTS

| JP | 2011-195089 A | 10/2011 |
| JP | 2020-11670 A | 1/2020 |
| WO | 2018/088465 A1 | 5/2018 |

*Primary Examiner* — Jacob M Amick
(74) *Attorney, Agent, or Firm* — Sughrue Mion, PLLC

(57) ABSTRACT

A rotating machine control device comprises: a first inverter that applies an alternating-current voltage to three-phase windings of a first system included in a rotating machine, based on a first direct-current voltage that has been output from a direct-current power supply of the first system; a second inverter that applies an alternating-current voltage to three-phase windings of a second system included in the rotating machine, based on a second direct-current voltage that has been output from a direct-current power supply of the second system; a first controller; and a second controller, in that the first controller and the second controller each limit an own system voltage command related to a voltage to be applied to the three-phase windings of an own system by use of a direct-current voltage of an other system, in a case where a direct-current voltage of the own system is higher than the direct-current voltage of the other system, and also generate a value obtained by normalizing the own system voltage command by use of the direct-current voltage of the own system, as a command value to an inverter of the own system.

12 Claims, 13 Drawing Sheets

(51) Int. Cl.
*H02P 25/22* (2006.01)
*H02P 27/08* (2006.01)

(56) References Cited

U.S. PATENT DOCUMENTS

| | | | |
|---|---|---|---|
| 2020/0023888 A1 | 1/2020 | Horitake | |
| 2020/0251966 A1* | 8/2020 | Endo | H02P 27/06 |
| 2020/0313590 A1* | 10/2020 | Otake | B62D 5/0463 |
| 2021/0046973 A1* | 2/2021 | Koseki | H02P 29/028 |

* cited by examiner

… (1)

ROTATING MACHINE CONTROL DEVICE AND ELECTRIC POWER STEERING DEVICE

CROSS REFERENCE TO RELATED APPLICATIONS

This application is a National Stage of International Application No. PCT/JP2021/015673 filed Apr. 6, 2021.

TECHNICAL FIELD

The present disclosure relates to a rotating machine control device and an electric power steering device.

BACKGROUND ART

In an electric power steering device that assists steering with driving force of a rotating machine, a rotating machine control device that controls an assist amount for the steering in two independent systems has been conventionally known (see, for example, Patent Document 1). In such a rotating machine control device, in Patent Document 1, in a case where an arithmetic operation of the assist amount is performed independently in each system and electric current control is conducted independently, mismatch between systems may occur. For this reason, for example, in the technique described in Patent Document 2, a master controller and a slave controller are provided. By transmitting a command value obtained by an arithmetic operation by the master controller to the slave controller, the mismatch between the systems is reduced.

CITATION LIST

Patent Document

Patent Document 1

Japanese Unexamined Patent Application, First Publication No. 2011-195089

Patent Document 2

PCT International Publication No. WO 2018/088465

SUMMARY OF INVENTION

Technical Problem

In the rotating machine, by the way, an electric current caused to flow to the rotating machine is determined in accordance with the difference between an induced voltage generated in proportion to the rotational speed and an applied voltage of a power converter (for example, an inverter) that drives the rotating machine. Therefore, when the rotating machine rotates at high speed, the induced voltage increases, and the voltage necessary for causing the electric current to flow in accordance with the command value to the rotating machine may become larger than an upper limit value of the applied voltage of the inverter. That is, the electric current caused to flow to the rotating machine is caused to flow, based on the difference between the upper limit value of the applied voltage and the induced voltage, and thus an electric current different from the command value may be caused to flow to the rotating machine. In this case, if the inverters of the respective systems receive the supply of a direct-current voltage from an identical DC power supply, no mismatch between the systems occurs. However, in a case where the inverters of the respective systems receive the supply of the DC voltages from different DC power supplies, the difference between the DC voltages from a plurality of DC power supplies appears to be the difference between the applied voltages applied from the plurality of inverters to the rotating machine. Hence, the mismatch between the systems may occur.

As described above, in the conventional rotating machine control device, for example, in the case where the difference occurs between the DC voltages output from the DC power supplies of the plurality of systems that control the rotating machine, there still remains a possibility that the mismatch between the systems occurs.

The present disclosure has been made to address the above issue, and has an object to provide a rotating machine control device and an electric power steering device, which are capable of reducing mismatch between systems, even in a case where a difference occurs between DC voltages to be output from DC power supplies of a plurality of systems that control the rotating machine.

Solution to Problem

In order to solve the above problem, one aspect of the present disclosure is a rotating machine control device comprising: a first inverter that applies an alternating-current voltage to three-phase windings of a first system included in a rotating machine, based on a first direct-current voltage that has been output from a direct-current power supply of the first system; a second inverter that applies an alternating-current voltage to three-phase windings of a second system included in the rotating machine, based on a second direct-current voltage that has been output from a direct-current power supply of the second system; a first controller that generates a command value to the first inverter, based on a command value of the rotating machine, the first direct-current voltage, and the second direct-current voltage; and a second controller that generates a command value to the second inverter, based on the command value of the rotating machine, the first direct-current voltage, and the second direct-current voltage, in that the first controller and the second controller each limit an own system voltage command related to a voltage to be applied to the three-phase windings of an own system by use of a direct-current voltage of an other system, in a case where a direct-current voltage of the own system is higher than a direct-current voltage of the other system, and also generate a value obtained by normalizing the own system voltage command by use of the direct-current voltage of the own system, as a command value to an inverter of the own system.

In addition, one aspect of the present disclosure is an electric power steering device comprising: the above-described rotating machine control device; the rotating machine that assists steering; and a torque sensor that detects steering torque in the steering, in that the rotating machine control device controls the rotating machine with an assist command of the steering in accordance with the steering torque that has been detected by the torque sensor, as a command value of the rotating machine.

Advantageous Effects of Invention

According to the present disclosure, even in a case where a difference occurs between DC voltages to be output from DC power supplies of a plurality of systems that control a rotating machine, the mismatch between the systems can be reduced.

DESCRIPTION OF EMBODIMENTS

Hereinafter, a rotating machine control device and an electric power steering device according to embodiments of the present disclosure will be described with reference to the drawings.

First Embodiment

Figure 1:
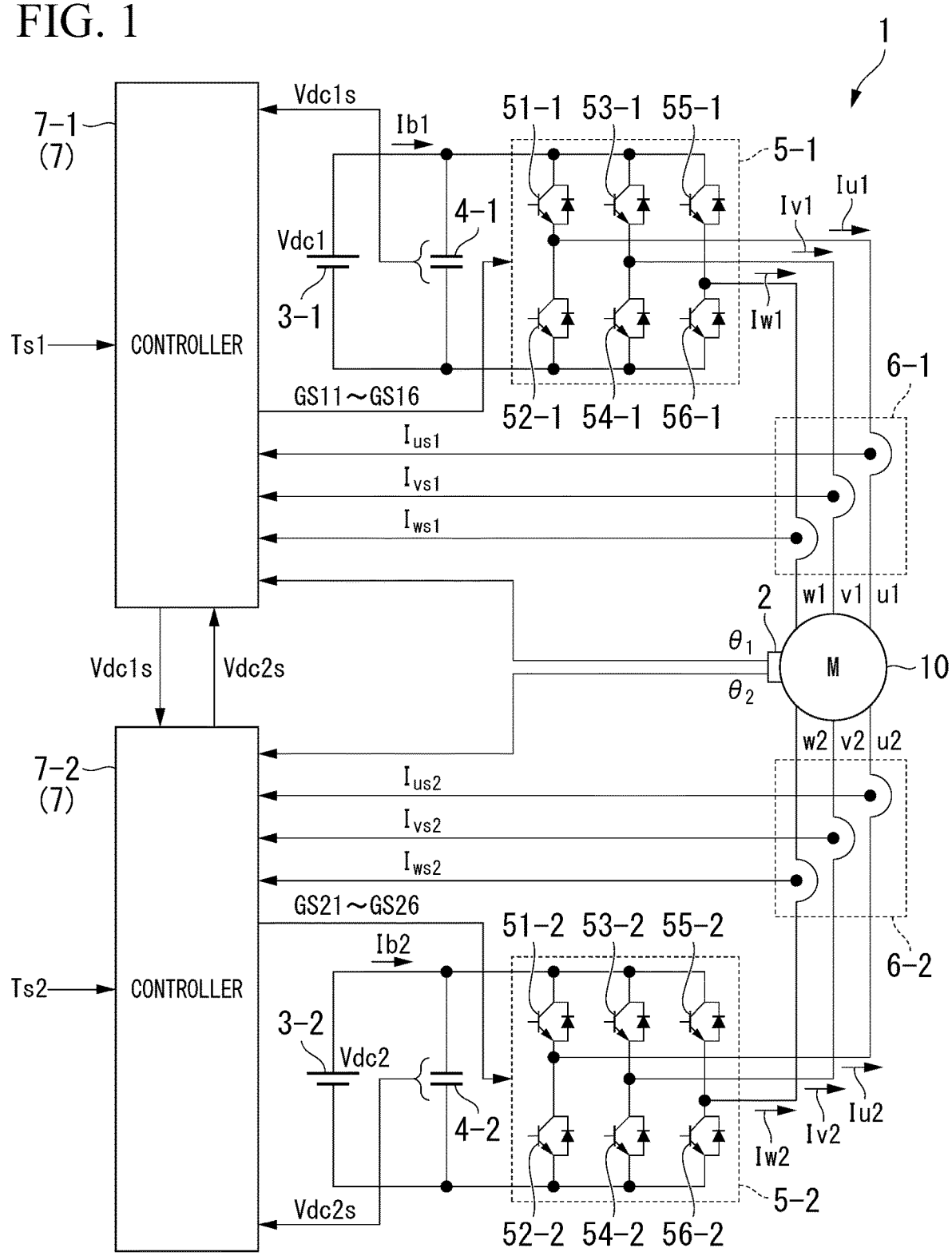
FIG. 1 is a block diagram illustrating an example of a rotating machine control device according to a first embodiment.

FIG. 1 is a block diagram illustrating an example of a rotating machine control device 1 according to a first embodiment.

The rotating machine control device 1 according to the first embodiment is a control device that controls a rotating machine 10. As illustrated in FIG. 1, the rotating machine control device 1 includes a position detector 2, a DC power supply 3-1, a DC power supply 3-2, a capacitor 4-1, a capacitor 4-2, an inverter 5-1, an inverter 5-2, an electric current detector 6-1, an electric current detector 6-2, a controller 7-1, and a controller 7-2.

The rotating machine control device 1 controls the rotating machine 10 by use of two systems of a first system and a second system. The first system includes the DC power supply 3-1, the capacitor 4-1, the inverter 5-1, the electric current detector 6-1, and the controller 7-1. The second system includes the DC power supply 3-2, the capacitor 4-2, the inverter 5-2, the electric current detector 6-2, and the controller 7-2.

Note that in the present embodiment, "-1" is applied to a reference number of a constitution included in the first system, and "-2" is applied to a reference number of a constitution included in the second system. Regarding each constitution of the first system and each constitution of the second system, in a case where any constitution included in the rotating machine control device 1 is indicated or in a case where the systems are not particularly distinguished from each other, "-1" or "-2" indicating the system from the reference number will be deleted in expression. For example, in a case where the constitution of the first system and the constitution of the second system are respectively indicated, "-1" or "-2" indicating the system is added to the reference number.

The rotating machine 10 is a rotating machine including three-phase windings (u1, v1, w1) of the first system and three-phase windings (u2, v2, w2) of the second system. The rotating machine 10 is, for example, a permanent magnet synchronous motor, an induction motor, a synchronous reluctance motor, or the like. Any motor including two sets of three-phase windings is applicable to the present disclosure. In the following description of the present embodiment, an example in which the rotating machine 10 is a non-salient pole type of permanent magnet synchronous motor will be described.

The position detector 2 detects a rotational position $\theta$ of the rotating machine 10, as a rotational position $\theta_1$ ($=\theta$) of the first system and a rotational position $\theta_2$ ($=\theta$) of the second system. The position detector 2 outputs the rotational position $\theta_1$ of the first system to the controller 7-1 to be described later. In addition, the position detector 2 outputs the rotational position $\theta_2$ of the second system to the controller 7-2 to be described later.

Note that the position detector 2 here is described in a case of a redundant type of outputting two rotational position signals. However, without being limited to the redundant type, furthermore, the rotational position $\theta_1$ of the first system and the rotational position $\theta_2$ of the second system may be obtained by use of a rotational position sensorless control method.

The DC power supply 3-1 is a DC power supply having two outputs on a high potential side and a low potential side in the first system, and is an example of a first DC power supply. The DC power supply 3-1 outputs a first DC voltage Vdc1 to the inverter 5-1 to be described later, as both end voltages of the two outputs on the high potential side and the low potential side. Examples of the DC power supply 3-1 include all devices that output a DC voltage, such as a battery, a DC-DC converter, a diode rectifier, and a PWM rectifier.

The DC power supply 3-2 is a DC power supply including two outputs on a high potential side and a low potential side in the second system, and is an example of a second DC power supply. The DC power supply 3-2 outputs a second DC voltage Vdc2 to the inverter 5-2 to be described later, as both end voltages of the two outputs on the high potential side and the low potential side. Examples of the DC power supply 3-2 include all devices that output a DC voltage, such as a battery, a DC-DC converter, a diode rectifier, and a PWM rectifier.

The capacitor 4-1 is a capacitor having a predetermined capacitance. The capacitor 4-1 is connected between two output signal lines of the DC power supply 3-1, and is electrically connected in parallel with the DC power supply 3-1. The capacitor 4-1 functions as a smoothing capacitor, which suppresses fluctuation of the first DC voltage Vdc1 to be supplied to the inverter 5-1 to be described later, and which achieves a stable DC voltage. Note that the DC voltage Vdc1 in the capacitor 4-1 is detected by, for example, a voltage detector, not illustrated, and is output to the controller 7-1 to be described later, as a detected DC voltage Vdc1s.

The capacitor 4-2 is a capacitor having a predetermined capacitance. The capacitor 4-2 is connected between two output signal lines of the DC power supply 3-2, and is electrically connected in parallel with the DC power supply 3-2. The capacitor 4-2 functions as a smoothing capacitor, which suppresses fluctuation of the second DC voltage Vdc2 to be supplied to the inverter 5-2 to be described later, and which achieves a stable DC voltage. Note that the DC voltage Vdc2 in the capacitor 4-2 is detected by, for example, a voltage detector, not illustrated, and is output to the controller 7-2 to be described later, as a detected DC voltage Vdc2s.

The inverter 5-1 (an example of a first inverter) applies an alternating current voltage to the three-phase windings (u1, v1, w1) in the first system of the rotating machine 10, based on the first DC voltage Vdc1 that has been output from the DC power supply 3-1. Three switching elements (51-1, 53-1, 55-1) on the high potential side of the DC power supply 3-1 and three switching elements (52-1, 54-1, 56-1) on the low potential side of the DC power supply 3-1 are turned on and off, based on control signals GS11 to GS16 (an example of a first control signal) output from the controller 7-1 to be described later, and the inverter 5-1 performs power conversion of the first DC voltage Vdc1 output from the DC power supply 3-1, and applies an AC voltage to the three-phase windings (u1, v1, w1) in the first system. Accordingly, the inverter 5-1 causes an electric current Iu1, an electric current Iv1, and an electric current Iw1 to flow to the three-phase windings (u1, v1, w1) of the first system.

Here, the control signal GS11, the control signal GS13, and the control signal GS15 are control signals for respectively turning on and off (bringing into a conduction state or a non-conduction state) the switching element 51-1, the switching element 53-1, and the switching element 55-1 on the high potential side in the inverter 5-1. In addition, the control signal GS12, the control signal GS14, and the control signal GS16 are control signals for respectively turning on and off (bringing into a conduction state or a non-conduction state) the switching element 52-1, the switching element 54-1, and the switching element 56-1 on the low potential side in the inverter 5-1.

It is assumed that, for example, in a case of a logic state of "1" (or High), the control signals GS11 to GS16 set the switching elements in ON state, and in a case of the logic state of "0" (or Low), the control signals GS11 to GS16 set the switching elements in OFF state.

The switching element 51-1, the switching element 52-1, the switching element 53-1, the switching element 54-1, the switching element 55-1, and the switching element 56-1 are each, for example, a semiconductor switch such as an insulated gate bipolar transistor (IGBT), a bipolar transistor, or a metal oxide semiconductor (MOS) power transistor. In addition, a diode (or a body diode) is connected in anti-parallel with each the switching element 51-1, the switching element 52-1, the switching element 53-1, the switching element 54-1, the switching element 55-1, and the switching element 56-1.

The inverter 5-2 (an example of a second inverter) applies an AC voltage to the three-phase windings (u2, v2, w2) in the second system of the rotating machine 10, based on the second DC voltage Vdc2 that has been output from the DC power supply 3-2. Three switching elements (51-2, 53-2, 55-2) on the high potential side of the DC power supply 3-2 and three switching elements (52-2, 54-2, 56-2) on the low potential side of the DC power supply 3-2 are turned on and off, based on control signals GS21 to GS26 (an example of a second control signal) output from the controller 7-2 to be described later, and the inverter 5-2 performs power conversion of the second DC voltage Vdc2 output from the DC power supply 3-2, and applies an AC voltage to the three-phase windings (u2, v2, w2) in the second system. Accordingly, the inverter 5-2 causes an electric current Iu2, an electric current Iv2, and an electric current Iw2 to flow to the three-phase windings (u2, v2, w2) of the second system.

Here, the control signal GS21, the control signal GS23, and the control signal GS25 are control signals for respectively turning on and off (bringing into a conduction state or a non-conduction state) the switching element 51-2, the switching element 53-2, and the switching element 55-2 on the high potential side in the inverter 5-2. In addition, the control signal GS22, the control signal GS24, and the control signal GS26 are control signals for respectively turning on and off (bringing into a conduction state or a non-conduction state) the switching element 52-2, the switching element 54-2, and the switching element 56-2 on the low potential side in the inverter 5-2.

It is assumed that, for example, in a case of a logic state of "1" (or High), the control signals GS21 to GS26 set the switching elements in ON state, and in a case of the logic state of "0" (or Low), the control signals GS21 to GS26 set the switching elements in OFF state.

The switching element 51-2, the switching element 52-2, the switching element 53-2, the switching element 54-2, the switching element 55-2, and the switching element 56-2 are each, for example, a semiconductor switch such as an IGBT, a bipolar transistor, or a MOS power transistor. In addition, a diode (or a body diode) is connected in anti-parallel with each the switching element 51-2, the switching element 52-2, the switching element 53-2, the switching element 54-2, the switching element 55-2, and the switching element 56-2.

The electric current detector 6-1 (an example of a first electric current detector) detects the electric current Iu1, the electric current Iv1, and the electric current Iw1, which respectively flow through the three-phase windings (u1, v1, w1) in the first system of the rotating machine 10, as an electric current value $I_{us1}$, an electric current value $I_{vs1}$, and an electric current value $I_{ws1}$. The electric current detector 6-1 may be of a type in which an electric current detection resistance (shunt resistance) is provided in series with the switching element 52-1, the switching element 54-1, and the switching element 56-1 of the inverter 5-1 to perform detection (so-called lower arm three-shunt type). In addition, the electric current detector 6-1 may use a type (bus-line single-shunt type) in which an electric current detection resistance is provided between the inverter 5-1 and the capacitor 4-1 to detect a direct current, and the electric current Iu1, the electric current Iv1, and the electric current Iw1, which respectively flow through the three-phase windings (u1, v1, w1) in the first system of the rotating machine 10 are reproduced.

The electric current detector 6-2 (an example of a second electric current detector) detects the electric current Iu2, the electric current Iv2, and the electric current Iw2, which respectively flow through the three-phase windings (u2, v2, w2) in the second system of the rotating machine 10, as an electric current value $I_{us2}$, an electric current value $I_{vs2}$, and an electric current value $I_{ws2}$. The electric current detector 6-2 may be of a type in which an electric current detection resistance (shunt resistance) is provided in series with the switching element 52-2, the switching element 54-2, and the switching element 56-2 of the inverter 5-2 to perform detection (so-called lower arm three-shunt type). In addition, the electric current detector 6-2 may use a type (bus-line single-shunt type) in which an electric current detection resistance is provided between the inverter 5-2 and the capacitor 4-2 to detect a direct current, and the electric current Iu2, the electric current Iv2, and the electric current Iw2, which respectively flow through the three-phase windings (u2, v2, w2) in the second system of the rotating machine 10 are reproduced.

The controller 7-1 (an example of a first controller) includes, for example, a central processing unit (CPU), and controls the rotating machine 10 by the first system. The controller 7-1 generates a command value to the inverter 5-1, based on a command value Ts1 (command signal) of the rotating machine 10, the first DC voltage Vdc1 (=Vdc1s), and the second DC voltage Vdc2 (=Vdc2s). The controller 7-1 sets electric current command values (Id_target1=0, Iq_target1) of the electric current to flow to the rotating machine 10, as control target values of the rotating machine 10, based on the command value Ts1 of the rotating machine 10, The controller 7-1 outputs the control signals GS11 to GS16 (first control signals) related to switching of the inverter 5-1, based on the electric current command values (Id_target1, Iq_target1), the rotational position $\theta_1$ that has been detected by the position detector 2, the electric current value $I_{us1}$, the electric current value $I_{vs1}$, and the electric current value $I_{ws1}$ that have been detected by the electric current detector 6-1, the first DC voltage Vdc1s, and the second DC voltage Vdc2s that has been acquired from the controller 7-2.

In a case where the DC voltage Vdc1s of the own system is higher than the DC voltage Vdc2s of the other system, the controller 7-1 limits the own system voltage command related to the voltages to be applied to the three-phase windings of the own system by use of the DC voltage Vdc2s of the other system. In addition, the controller 7-1 generates a value obtained by normalizing the own system voltage command by use of the DC voltage Vdc1s of the own system, as a command value to the inverter of the own system.

Note that details of the constitution of the controller 7-1 will be described later with reference to FIG. 2.

The controller 7-2 (an example of a second controller) includes, for example, a CPU, and controls the rotating machine 10 by the second system. The controller 7-2 generates a command value to the inverter 5-2, based on a command value Ts2 of the rotating machine 10, the first DC voltage Vdc1 (=Vdc1s), and the second DC voltage Vdc2 (=Vdc2s). The controller 7-2 sets electric current command values (Id_target2=0, Iq_target2) of the electric current to flow to the rotating machine 10, as control target values of the rotating machine 10, based on the command value Ts2 of the rotating machine 10.

The controller 7-2 outputs the control signals GS21 to GS26 (second control signals) related to switching of the inverter 5-2, based on the electric current command values (Id_target2, Iq_target1), the rotational position $\theta_2$ that has been detected by the position detector 2, the electric current value $I_{us2}$, the electric current value $I_{vs2}$, and the electric current value $I_{ws2}$ that have been detected by the electric current detector 6-2, the second DC voltage Vdc2s, and the first DC voltage Vdc1s that has been acquired from the controller 7-1.

In a case where the DC voltage Vdc2s of the own system is higher than the DC voltage Vdc1s of the other system, the controller 7-2 limits the own system voltage command related to the voltages to be applied to the three-phase windings of the own system by use of the DC voltage Vdc1s of the other system. In addition, the controller 7-2 generates a value obtained by normalizing the own system voltage command by use of the DC voltage Vdc2s of the own system, as a command value to the inverter of the own system.

Note that details of the constitution of the controller 7-2 will be described later with reference to FIG. 2.

Next, details of the constitutions of the controller 7-1 and the controller 7-2 will be described with reference to FIG. 2.

Figure 2:
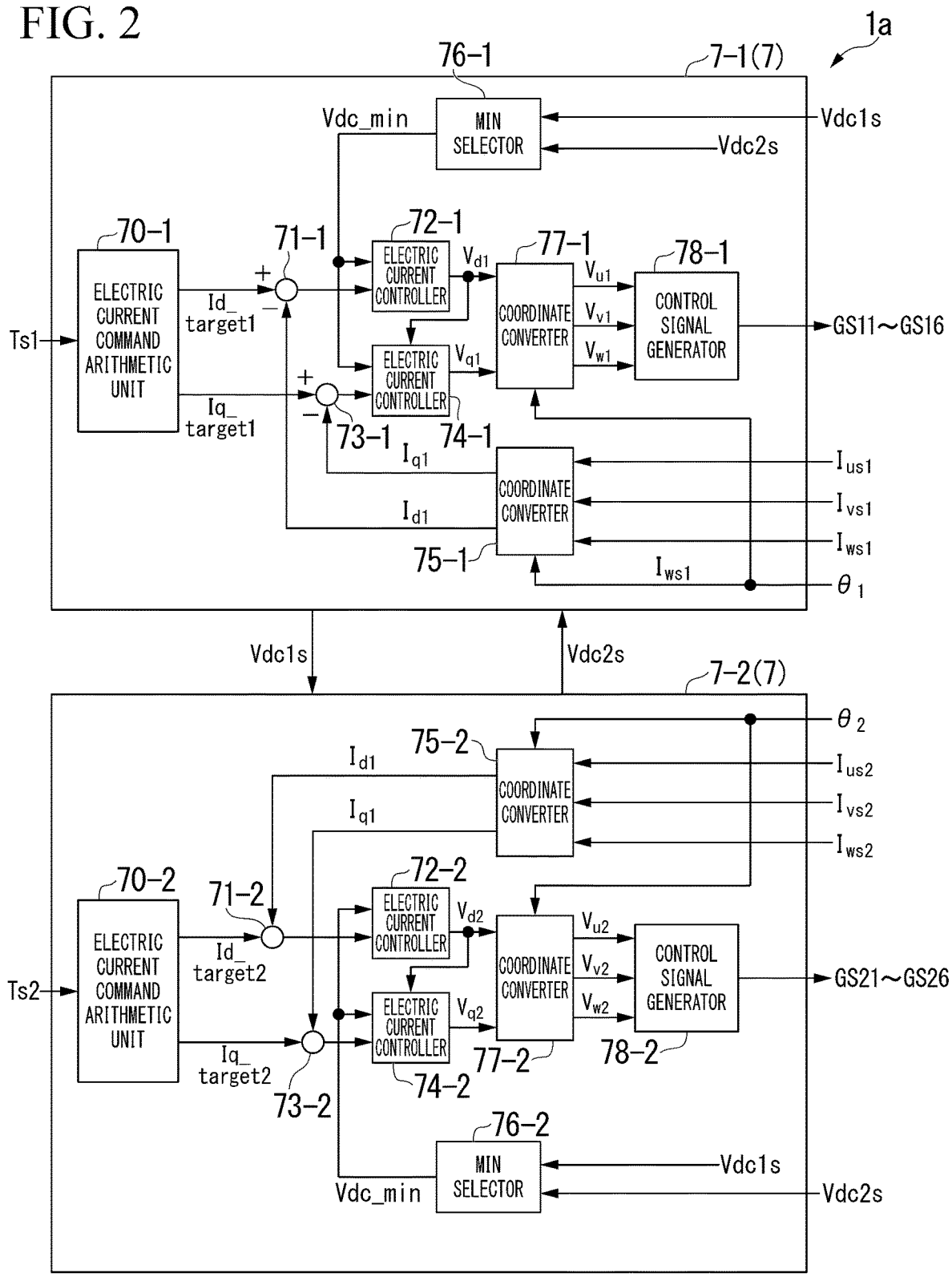
FIG. 2 is a block diagram illustrating an example of controllers in two systems of the rotating machine control device according to the first embodiment.

FIG. 2 is a block diagram illustrating an example of the controllers 7 in two systems of the rotating machine control device 1 according to the present embodiment.

As illustrated in FIG. 2, the controller 7-1 includes an electric current command arithmetic unit 70-1, a subtractor 71-1, an electric current controller 72-1, a subtractor 73-1, an electric current controller 74-1, a coordinate converter 75-1, a MIN selector 76-1, a coordinate converter 77-1, and a control signal generator 78-1.

The electric current command arithmetic unit 70-1 generates a d-axis electric current command value Id_target1 and a q-axis electric current command value Id_target1 of the first system from the command value (Ts1) of the rotating machine.

The coordinate converter 75-1 converts the electric current value $I_{us1}$, the electric current value $I_{vs1}$, and the electric current value $I_{ws1}$ that have been detected by the electric current detector 6-1 into an electric current $I_{d1}$ and an electric current $I_{q1}$ on two axes of rotation, based on the rotational position $\theta_1$. Specifically, the coordinate converter 75-1 generates the electric current $I_{d1}$ and the electric current $I_{q1}$ on two axes of rotation from the electric current value $I_{us1}$, the electric current value $I_{vs1}$, and the electric current value $I_{ws1}$, and the rotational position $\theta_1$, in the following equation (1).

[Equation 1]

$$\begin{pmatrix} I_{d1} \\ I_{q1} \end{pmatrix} = \frac{\sqrt{2}}{\sqrt{3}} \begin{bmatrix} \cos(\theta_1) & \cos\left(\theta_1 - \frac{2\pi}{3}\right) & \cos\left(\theta_1 + \frac{2\pi}{3}\right) \\ -\sin(\theta_1) & -\sin\left(\theta_1 - \frac{2\pi}{3}\right) & -\sin\left(\theta_1 + \frac{2\pi}{3}\right) \end{bmatrix} \begin{bmatrix} I_{us1} \\ I_{vs1} \\ I_{ws1} \end{bmatrix} \quad (1)$$

The subtractor 71-1 subtracts the electric current $I_{d1}$ on two axes of rotation from the d-axis electric current command value Id_target1, and outputs its result to the electric current controller 72-1. The electric current $I_{d1}$ is output from the coordinate converter 75-1.

The subtractor 73-1 subtracts the electric current $I_{q1}$ on two axes of rotation from the q-axis electric current command value Iq_target1, and outputs its result to the electric current controller 74-1. The electric current $I_{q1}$ is output from the coordinate converter 75-1.

The MIN selector 76-1 compares the first DC voltage Vdc1s with the second DC voltage Vdc2s, and outputs a lower one (one having a smaller value) as a DC voltage minimum value Vdc_min.

The electric current controller 72-1 conducts proportional and integral control on an output value of the subtractor 71-1, so that the output value of the subtractor 71-1 becomes "0" (zero), and outputs a voltage $V_{d1}$ on two axes of rotation. Here, a detailed constitution of the electric current controller 72-1 will be described with reference to FIG. 3.

Figure 3:
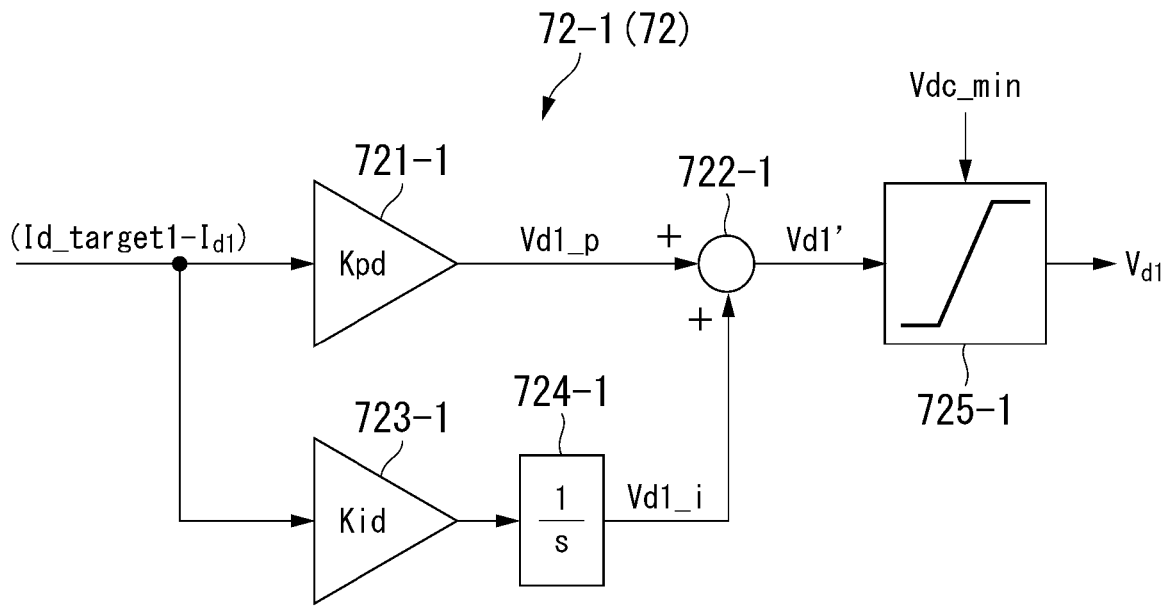
FIG. 3 is a block diagram illustrating an example of an electric current controller that generates a d-axis voltage command value in the first embodiment.

FIG. 3 is a block diagram illustrating an example of the electric current controller 72-1, which generates a d-axis voltage command value in the present embodiment.

As illustrated in FIG. 3, the electric current controller 72-1 includes an amplifier 721-1, an adder 722-1, an amplifier 723-1, an integrator 724-1, and a limiter 725-1.

The amplifier 721-1 multiplies (the d-axis electric current command value Id_target1–$I_{d1}$) by Kpd, and outputs its result to the adder 722-1, as an output value Vd1_p. Here, an amplification coefficient Kpd is, for example, a value ($\omega cc \times$ Ld) obtained by multiplying a desired electric current control response $\omega cc$ ([rad/s (radian/second)]) by a d-axis inductance Ld of the rotating machine 10.

The amplifier 723-1 multiplies (the d-axis electric current command value Id_target1–$I_{d1}$) by Kid, and outputs its result. Here, an amplification coefficient Kid is, for example, a value ($\omega cc \times R$) obtained by multiplying a desired electric current control response $\omega cc$ by a winding resistance R of the rotating machine 10.

The integrator 724-1 integrates an output (Kid× Id1_target1–$I_{d1}$)) of the amplifier 723-1, and outputs its result as an output value Vd1_i. That is, the value Vd1_i is (Kid/s×Id1_target1–$I_{d1}$)). Here, "s" represents a Laplace operator.

The adder 722-1 adds the output value Vd1_p of the amplifier 721-1 and the output value Vd1_i of the integrator 724-1, and outputs its result to the limiter 725-1, as an output value Vd1'.

The limiter 725-1 limits the output value Vd1' of the adder 722-1, based on the DC voltage minimum value Vdc_min. Specifically, the limiter 725-1 limits the output value Vd1' of the adder 722-1 in the following equation (2), and generates the voltage $V_{d1}$ on two axes of rotation that is an output value.

[Equation 2]

$$\left. \begin{array}{l} V_{d1} = -\text{Vdc\_min}/\sqrt{2}, \left(Vd1' < -\text{Vdc\_min}/\sqrt{2}\right) \\ V_{d1} = Vd1', \left(-\text{Vdc\_min}/\sqrt{2} < Vd1' < \text{Vdc\_min}/\sqrt{2}\right) \\ V_{d1} = \text{Vdc\_min}/\sqrt{2}, \left(\text{Vdc\_min}/\sqrt{2} < Vd1'\right) \end{array} \right\} \quad (2)$$

As expressed in the equation (2), the limiter 725-1 generates the voltage $V_{d1}$ on two axes of rotation as follows, in accordance with a relationship between the output value Vd1' of the adder 722-1 and the DC voltage minimum value Vdc_min.

(a) In a case where the output value Vd1' of the adder 722-1 is smaller than (–Vdc_min/$2^{0.5}$), the limiter 725-1 generates (–Vdc_min/$2^{0.5}$) as the voltage $V_{d1}$ ($V_{d1}$=–Vdc_min/$2^{0.5}$).

(b) In a case where the output value Vd1' of the adder 722-1 falls between (–Vdc_min/$2^{0.5}$) and (Vdc_min/$2^{0.5}$), the limiter 725-1 generates the output value Vd1' of the adder 722-1, as the voltage $V_{d1}$ ($V_{d1}$=Vd1').

(c) In a case where the output value Vd1' of the adder 722-1 is larger than (Vdc_min/$2^{0.5}$), the limiter 725-1 generates (Vdc_min/$2^{0.5}$) as the voltage $V_{d1}$ ($V_{d1}$=Vdc_min/$2^{0.5}$).

In this manner, the limiter 725-1 generates the voltage $V_{d1}$ so that an absolute value of the output value Vd1' of the adder 722-1 is equal to or smaller than (Vdc_min/$2^{0.5}$). Note that, for example, in a case where it is desired to actively reset the output value Vd1_i, which is an integration term, of the integrator 724-1, the limiter 725-1 may use anti-windup control of a known technique.

Returning to the description of FIG. 2, the electric current controller 74-1 conducts proportional and integral control on an output value of the subtractor 73-1, so that the output value of the subtractor 73-1 becomes "0" (zero), and outputs a voltage $V_{q1}$ on two axes of rotation. Here, a detailed constitution of the electric current controller 74-1 will be described with reference to FIG. 4.

Figure 4:
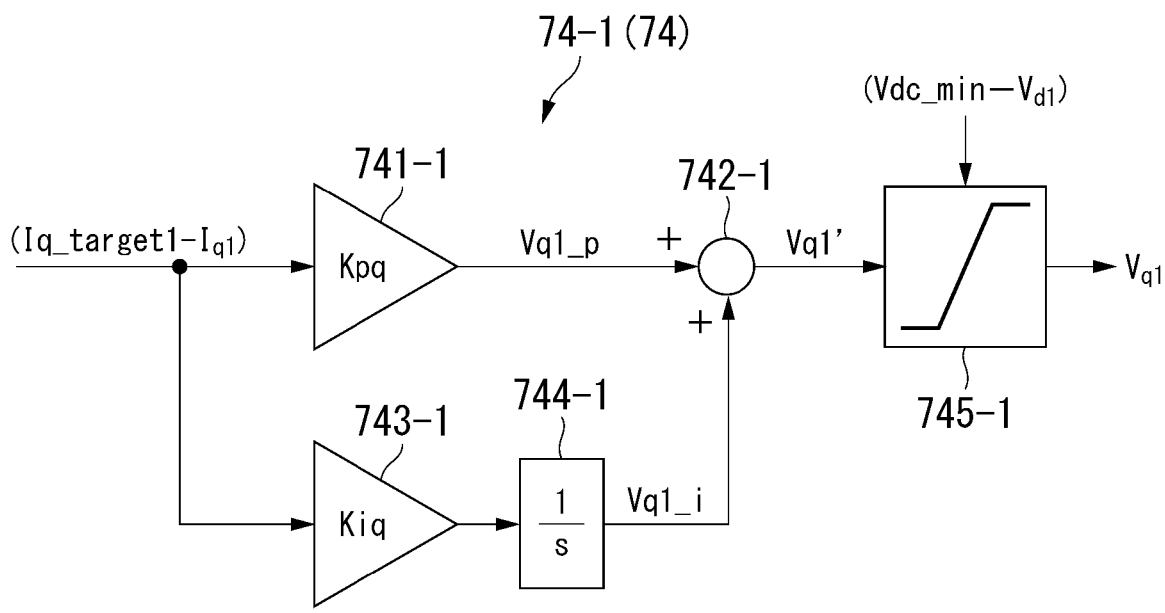
FIG. 4 is a block diagram illustrating an example of an electric current controller that generates a q-axis voltage command value in the first embodiment.

FIG. 4 is a block diagram illustrating an example of the electric current controller 74-1, which generates a q-axis voltage command value in the present embodiment. As illustrated in FIG. 4, the electric current controller 74-1 includes an amplifier 741-1, an adder 742-1, an amplifier 743-1, an integrator 744-1, and a limiter 745-1.

The amplifier 741-1 multiplies (the q-axis electric current command value Iq_target1–$I_{q1}$) by Kpq, and outputs its result to the adder 742-1, as an output value Vq1_p. Here, an amplification coefficient Kpq is, for example, a value ($\omega cc \times$ Lq) obtained by multiplying a desired electric current control response $\omega cc$ ([rad/s (radian/second)]) by a q-axis inductance Lq of the rotating machine 10.

The amplifier 743-1 multiples (the q-axis electric current command value Iq_target1–$I_{q1}$) by Kiq, and outputs its result. Here, an amplification coefficient Kiq is, for example, a value ($\omega cc \times R$) obtained by multiplying the desired electric current control response $\omega cc$ by the winding resistance R of the rotating machine 10.

The integrator 744-1 integrates the output (Kiq×(Iq_target1–$I_{q1}$)) of the amplifier 743-1, and outputs its result as an output value Vq1_i. That is, the value Vq1_i is (Kiq/s× (Iq_target1–$I_{q1}$)). Here, "s" represents a Laplace operator.

The adder 742-1 adds the output value Vq1_p of the amplifier 741-1 and the output value Vq1_i of the integrator 744-1, and outputs its result to the limiter 745-1, as an output value Vq1'.

The limiter 745-1 limits the output value Vq1' of the adder 742-1, based on the DC voltage minimum value Vdc_min and the voltage $V_{d1}$. Specifically, the limiter 745-1 limits the voltage Vq1' of the adder 742-1 in the following equation (3), and generates the voltage $V_{q1}$ on two axes of rotation that is an output value.

[Equation 3]

$$\left.\begin{aligned} V_{q1} &= -(\text{Vdc\_min} - V_{d1})/\sqrt{2}, \\ &\quad (Vq1' < -(\text{Vdc\_min} - V_{d1})/\sqrt{2}) \\ V_{q1} &= Vq1', \ (-(\text{Vdc\_min} - V_{d1})/\sqrt{2} < \\ &\quad Vq1' < (\text{Vdc\_min} - V_{d1})/\sqrt{2}) \\ V_{q1} &= (\text{Vdc\_min} - V_{d1})/\sqrt{2}, \ ((\text{Vdc\_min} - V_{d1})/\sqrt{2} < Vq1') \end{aligned}\right\} \quad (3)$$

As expressed in the equation (3), the limiter 745-1 generates the voltage $V_{q1}$ as follows in accordance with a relationship between the output value Vq1' of the adder 742-1 and a value obtained by subtracting the voltage $V_{d1}$ from the DC voltage minimum value Vdc_min (Vdc_min–$V_{d1}$).

(d) In a case where the output value Vq1' of the adder 742-1 is smaller than (–(Vdc_min–$V_{d1}$)/$2^{0.5}$), the limiter 745-1 generates (–(Vdc_min–$V_{d1}$)/$2^{0.5}$) as the voltage $V_{q1}$ ($V_{q1}$=–(Vdc_min–$V_{d1}$)/$2^{0.5}$).

(e) In a case where the output value Vq1' of the adder 742-1 falls between (–(Vdc_min–$V_{d1}$)/$2^{0.5}$) and ((Vdc_min–$V_{d1}$)/$2^{0.5}$), the limiter 745-1 generates the output value Vq1' of the adder 742-1, as the voltage $V_{q1}$ ($V_{q1}$=Vq1').

(f) In a case where the output value Vq1' of the adder 742-1 is larger than ((Vdc_min–$V_{d1}$)/$2^{0.5}$), the limiter 745-1 generates ((Vdc_min–$V_{d1}$)/$2^{0.5}$) as the voltage $V_{q1}$ ($V_{q1}$=(Vdc_min–$V_{d1}$)/$2^{0.5}$).

In this manner, the limiter 745-1 generates the voltage $V_{q1}$ so that an absolute value of the output value Vq1' of the adder 742-1 is equal to or smaller than ((Vdc_min–$V_{d1}$)/$2^{0.5}$). Note that, for example, in a case where it is desired to actively reset the output value Vq1_i, which is an integration term, of the integrator 744-1, the limiter 745-1 may use anti-windup control of a known technique.

Note that the voltage $V_{d1}$ and the voltage $V_{q1}$ that have been described above are voltage command values on two axes of rotation.

Returning to the description of FIG. 2 again, the coordinate converter 77-1 converts the voltage $V_{d1}$ and the voltage $V_{q1}$, which are voltage commands on two axes of rotation, into a voltage $V_{u1}$, a voltage $V_{v1}$, and a voltage $V_{w1}$, which are voltage commands on three-phase axes, based on the rotational position $\theta_1$. Specifically, the coordinate converter 77-1 generates the voltage $V_{u1}$, the voltage $V_{v1}$, and the voltage $V_{w1}$, which are voltage commands on three-phase axes, from the voltage $V_{d1}$, the voltage $V_{q1}$, and the rotational position $\theta_1$ in the following equation (4).

[Equation 4]

$$\begin{pmatrix} V_{u1} \\ V_{v1} \\ V_{w1} \end{pmatrix} = \frac{\sqrt{2}}{\sqrt{3}} \begin{bmatrix} \cos(\theta_1) & -\sin(\theta_1) \\ \cos\left(\theta_1 - \frac{2\pi}{3}\right) & -\sin\left(\theta_1 - \frac{2\pi}{3}\right) \\ \cos\left(\theta_1 + \frac{2\pi}{3}\right) & -\sin\left(\theta_1 + \frac{2\pi}{3}\right) \end{bmatrix} \begin{bmatrix} V_{d1} \\ V_{q1} \end{bmatrix} \quad (4)$$

The coordinate converter 77-1 outputs the voltage $V_{u1}$, the voltage $V_{v1}$, and the voltage $V_{w1}$ that have been generated to the control signal generator 78-1.

The control signal generator 78-1 outputs the control signals GS11 to GS16 of the inverter 5-1, based on the first DC voltage Vdc1s, and the voltage $V_{u1}$, the voltage $V_{v1}$, and the voltage $V_{w1}$, which are voltage command values on three-phase axes. Here, a detailed constitution of the control signal generator 78-1 will be described with reference to FIG. 5.

Figure 5:
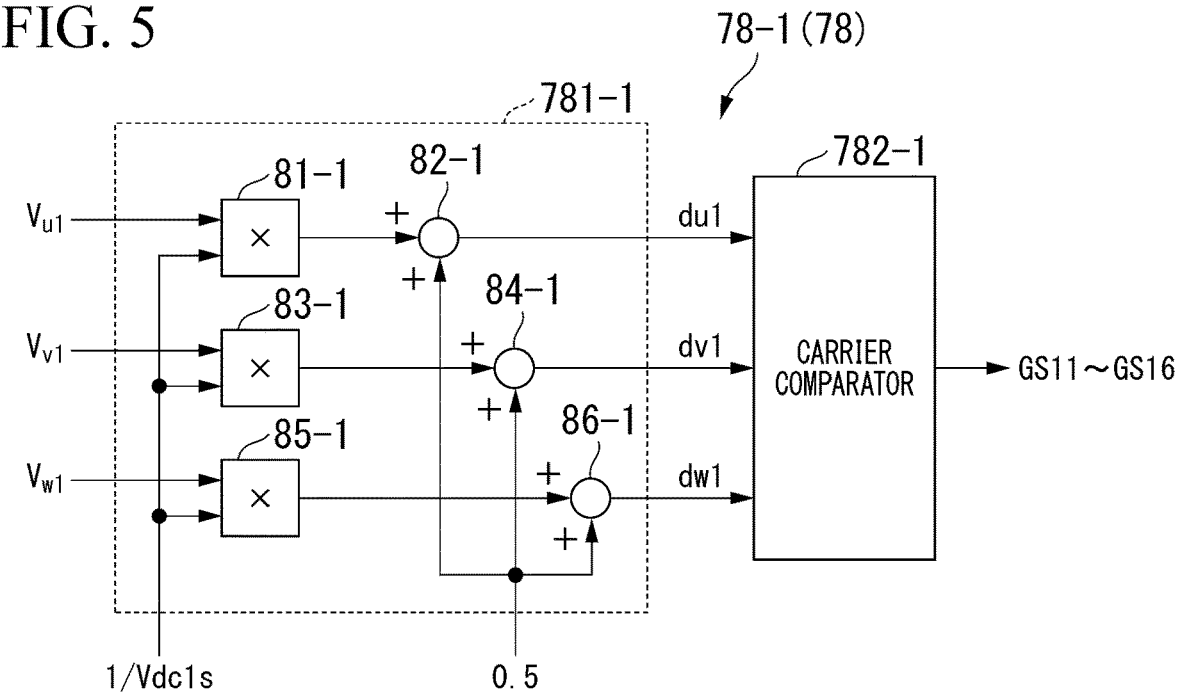
FIG. 5 is a block diagram illustrating an example of a control signal generator in the first embodiment.

FIG. 5 is a block diagram illustrating an example of the control signal generator 78-1 in the present embodiment.

As illustrated in FIG. 5, the control signal generator 78-1 includes a duty arithmetic unit 781-1 and a carrier comparator 782-1.

The duty arithmetic unit 781-1 outputs first duties (du1, dv1, dw1) that are values obtained by respectively normalizing by use of the first DC voltage Vdc1s, based on the voltage $V_{u1}$, the voltage $V_{v1}$, and the voltage $V_{w1}$. The duty arithmetic unit 781-1 generates the first duties (du1, dv1, dw1) in, for example, the following equation (5).

[Equation 5]

$$\left.\begin{aligned} du1 &= V_{u1} \times \frac{1}{Vdc1s} + 0.5 \\ dv1 &= V_{v1} \times \frac{1}{Vdc1s} + 0.5 \\ dw1 &= V_{w1} \times \frac{1}{Vdc1s} + 0.5 \end{aligned}\right\} \quad (5)$$

In addition, the duty arithmetic unit 781-1 includes a multiplier 81-1, an adder 82-1, a multiplier 83-1, an adder 84-1, a multiplier 85-1, and an adder 86-1.

The multiplier 81-1 multiplies the voltage $V_{u1}$ by (1/Vdc1s), and outputs its multiplication result to the adder 82-1.

The adder 82-1 adds "0.5", which is a constant, to the output value of the multiplier 81-1, and outputs its result to the carrier comparator 782-1, as a first duty du1.

The multiplier 83-1 multiplies the voltage $V_{v1}$ by (1/Vdc1s), and outputs its multiplication result to the adder 84-1.

The adder 84-1 adds "0.5", which is a constant, to the output value of the multiplier 83-1, and outputs its result to the carrier comparator 782-1, as a first duty dv1.

The multiplier 85-1 multiplies the voltage $V_{w1}$ by (1/Vdc1s), and outputs its multiplication result to the adder 86-1.

The adder 86-1 adds "0.5", which is a constant, to the output value of the multiplier 85-1, and outputs its result to the carrier comparator 782-1, as a first duty dw1.

Figure 6:
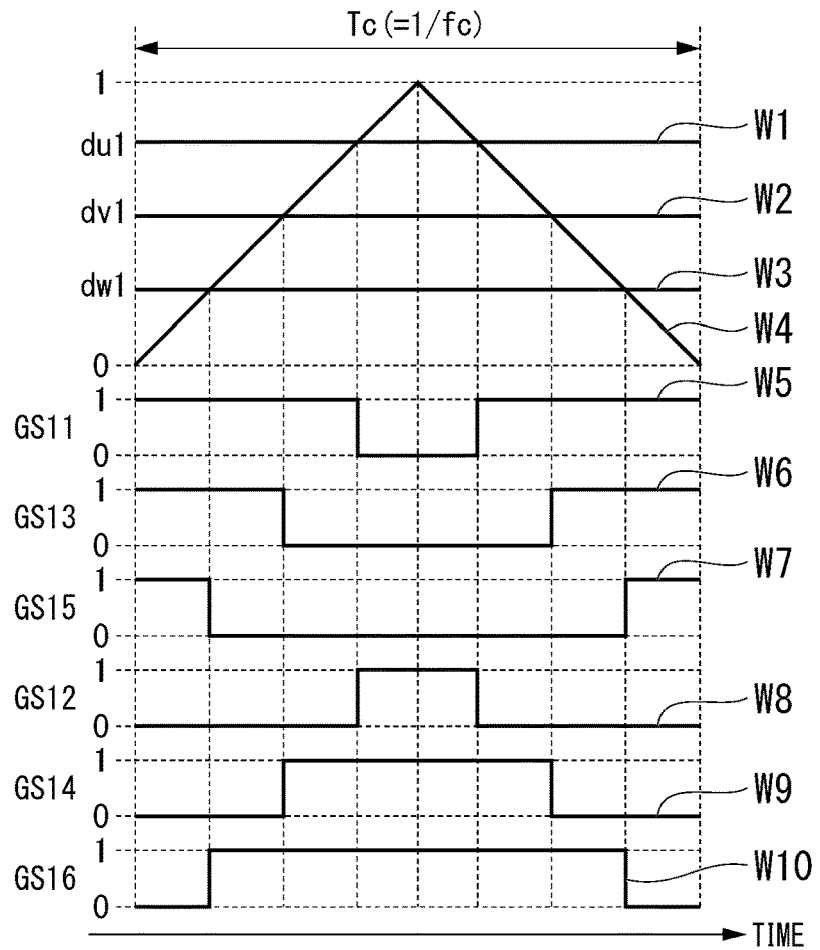
FIG. 6 is a diagram illustrating an example of processing of a carrier comparator in the first embodiment.

The carrier comparator 782-1 outputs the control signals GS11 to GS16 of the inverter 5-1, based on the first duties (du1, dv1, dw1). Here, processing of the carrier comparator 782-1 will be described with reference to FIG. 6. FIG. 6 is a diagram illustrating an example of processing of the carrier comparator 782-1 in the present embodiment.

In FIG. 6, waveforms W1 to W3 represent waveforms of the first duties (du1, dv1, dw1). In addition, a waveform W4 represents a waveform of a carrier wave CA of a triangular wave in which a peak level is "1" and a valley level is "0". Further, waveforms W5 to W10 sequentially represent waveforms of the control signal GS11, the control signal GS13, the control signal GS15, the control signal GS12, the control signal GS14, and the control signal GS16. Further, the horizontal axis of the graph illustrated in FIG. 6 represents time, and a period Tc (=1/fc, fc represents frequency) represents a period of the carrier wave CA.

As illustrated in FIG. 6, the carrier comparator 782-1 compares the first duties (du1, dv1, dw1) of the waveform W1 to the waveform W3 with the carrier wave CA of the waveform W4, and in a case where the first duty is higher in each phase, sets the control signals (GS11, GS13, GS15) respectively corresponding to the switching elements (51-1, 53-1, 55-1) on the high potential side of the inverter 5-1 in ON state (sets the value to "1"). In addition, in a case where the first duty is lower in each phase, the carrier comparator 782-1 sets the control signals (GS11, GS13, GS15) respectively corresponding to the switching elements (51-1, 53-1, 55-1) on the high potential side of the inverter 5-1 in OFF state (sets the value to "0").

Further, the carrier comparator 782-1 compares the first duties (du1, dv1, dw1) of the waveform W1 to the waveform W3 with the carrier wave CA of the waveform W4, and in a case where the first duty is lower in each phase, sets the control signals (GS12, GS14, GS16) respectively corresponding to the switching elements (52-1, 54-1, 56-1) on the low potential side of the inverter 5-1 in ON state (sets the value to "1"). In addition, in a case where the first duty is higher in each phase, the carrier comparator 782-1 sets the control signals (GS12, GS14, GS18) respectively corresponding to the switching elements (52-1, 54-1, 56-1) on the high potential side of the inverter 5-1 in OFF state (sets the value to "0").

According to such processing of the carrier comparator 782-1, for any one phase (X phase) of the respective phases, in a case where the first duty is assumed to be dx1, dx1 is a ratio at which the control signal on the high potential side sets the switching element in ON state in the period Tc of the carrier wave CA, and (1−dx1) is a ratio at which the control signal on the low potential side sets the switching element in OFF state. Therefore, the potential of the X phase of the inverter 5-1 is the first DC voltage Vdc1 in ON state on the high potential side, and the potential of the X phase of the inverter 5-1 is "0" (GND) in ON state on the low potential side. Accordingly, an output voltage Vx1_PWM of the X phase is expressed in the following equation (6).

[Equation 6]

$$Vx1\_PWM = dx1 \times Vdc1 \quad (6)$$

Here, from the equation (5) described above, the duty of the X phase is expressed in the following equation (7).

[Equation 7]

$$dx1 = V_{x1} \times \frac{1}{Vdc1s} + 0.5 \quad (7)$$

By substituting the equation (7) into the equation (6), the output voltage Vx1_PWM of the X-phase is expressed in the following equation (8).

[Equation 8]

$$Vx1\_PWM = V_{x1} \times \frac{Vdc1}{Vdc1s} + 0.5 \times Vdc1 \quad (8)$$

Here, in the output voltage Vx1_PWM of the X-phase to be actually output, in a case where the first DC voltage Vdc1s that has been detected is equal to the first DC voltage Vdc1 (real value), only Vx1 remains in the first term on the right side. As a result, the output voltage Vx1_PWM is a voltage in which the first term matches the command value Vx1 with (0.5×Vdc1) of the second term on the right side as the center. Therefore, the inverter 5-1 is capable of outputting the voltage in accordance with the command value.

Returning to the description of FIG. 2 again, the controller 7-2 includes an electric current command arithmetic unit 70-2, a subtractor 71-2, an electric current controller 72-2, a subtractor 73-2, an electric current controller 74-2, a coordinate converter 75-2, a MIN selector 76-2, a coordinate converter 77-2, and a control signal generator 78-2.

The electric current command arithmetic unit 70-2 generates the d-axis electric current command value Id_target2 and the q-axis electric current command value Iq_target2 of the second system, from the command value (Ts2) of the rotating machine 10. The electric current command arithmetic unit 70-2 has a similar constitution to the electric current command arithmetic unit 70-1.

The coordinate converter 75-2 converts the electric current value $I_{us2}$, the electric current value $I_{vs2}$, and the electric current value $I_{ws2}$ that have been detected by the electric current detector 6-2 into an electric current $I_{d2}$ and an electric current $I_{q2}$ on two axes of rotation, based on the rotational position $\theta_2$. The coordinate converter 75-2 has a similar constitution to the coordinate converter 75-1.

The MIN selector 76-2 compares the first DC voltage Vdc1s with the second DC voltage Vdc2s, and outputs a lower one (one having a smaller value) as a DC voltage minimum value Vdc_min. The MIN selector 76-2 has a similar constitution to the MIN selector 76-1.

The subtractor 71-2 subtracts the electric current $I_{d2}$ on two axes of rotation from the d-axis electric current command value Id_target2, and outputs its result to the electric current controller 72-2. The electric current $I_{d2}$ is output from the coordinate converter 75-2.

The subtractor 73-2 subtracts the electric current $I_{d2}$ on two axes of rotation from the q-axis electric current command value Iq_target2, and outputs its result to the electric current controller 74-2. The electric current $I_{d2}$ is output from the coordinate converter 75-2.

The electric current controller 72-2 conducts proportional and integral control on an output value of the subtractor 71-2, so that an output value of the subtractor 71-2 becomes "0" (zero), and outputs a voltage $V_{d2}$ on two axes of rotation. Since the constitution of the electric current controller 72-2 is similar to that of the electric current controller 72-1 described above, a description thereof is omitted here.

The electric current controller 74-2 conducts proportional and integral control on an output value of the subtractor 73-2, so that the output value of the subtractor 73-2 becomes "0" (zero), and outputs a voltage $V_{q2}$ on two axes of rotation. Since the constitution of the electric current controller 74-2 is similar to that of the electric current controller 74-1 described above, a description thereof is omitted here.

The coordinate converter 77-2 converts the voltage $V_{d2}$ and the voltage $V_{q2}$, which are voltage commands on two axes of rotation, into a voltage $V_{u2}$, a voltage $V_{v2}$, and a voltage $V_{w2}$, which are voltage commands on three-phase axes, based on the rotational position $\theta_2$. Since the constitution of the coordinate converter 77-2 is similar to that of the coordinate converter 77-1 described above, a description thereof is omitted here.

The control signal generator 78-2 outputs the control signals GS21 to GS26 of the inverter 5-2, based on the second DC voltage Vdc2s, and the voltage $V_{u2}$, the voltage $V_{v2}$, and the voltage $V_{w2}$, which are voltage command values on three-phase axes. Since the constitution of the control signal generator 78-2 is similar to that of the control signal generator 78-1 described above, a description thereof is omitted here.

Next, actions and effects of the rotating machine control device 1 according to the present embodiment will be described.

First, in the controller 7-1 of the first system, the electric current controller 72-1 and the electric current controller 74-1 limit the output $V_{d1}$ and the output $V_{q1}$, which are voltage commands, based on the DC voltage minimum value Vdc_min, which is an output of the MIN selector 76-1.

Figure 7:
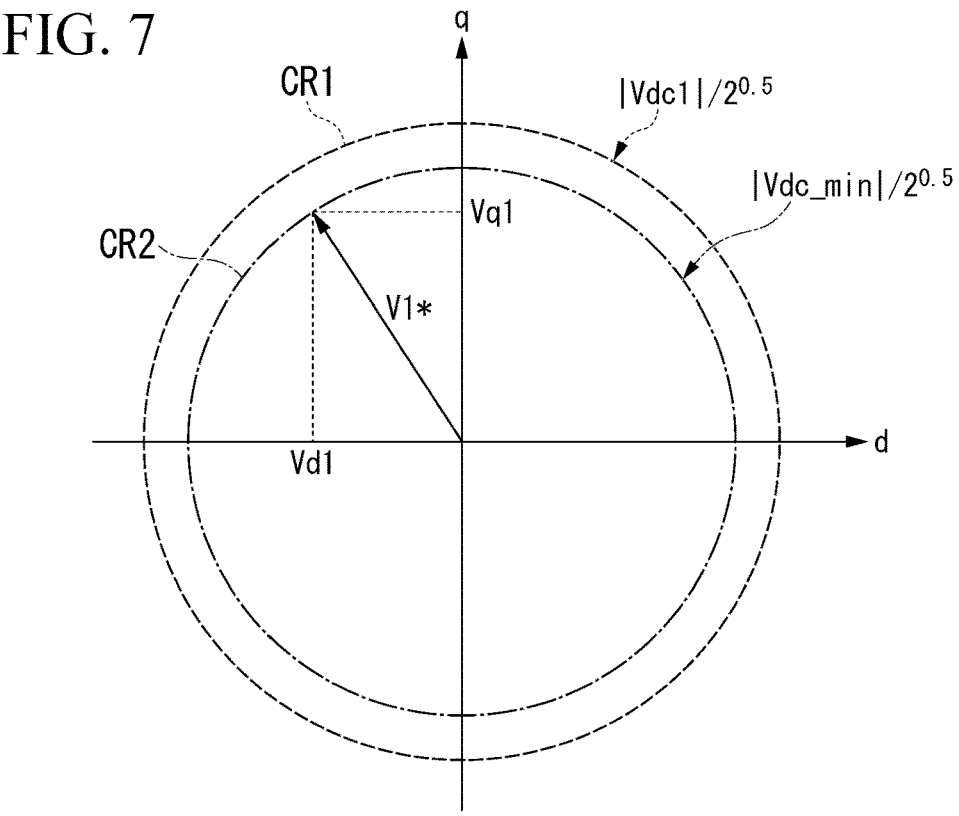
FIG. 7 is a diagram illustrating an example of a voltage command vector in a first system in the first embodiment.

For example, in a case where the first DC voltage Vdc1 is larger than the second DC voltage Vdc2 (Vdc1>Vdc2), a first voltage command vector V1* that has been generated from the output $V_{d1}$ and the output $V_{q1}$ is limited to a circle CR2 (the size falls within |Vdc_min|/$2^{0.5}$) as illustrated in FIG. 7. In this case, the first DC voltage Vdc1 is larger than the second DC voltage Vdc2 (Vdc1>Vdc2), and thus |Vdc_min| is the second DC voltage Vdc2 (|Vdc_min|=Vdc2). Note that in FIG. 7, a circle CR1 represents a circle having a size of |Vdc1|/$2^{0.5}$, in a case where the first DC voltage Vdc1 is used for comparison.

Next, in the controller 7-2 of the second system, the electric current controller 72-2 and the electric current controller 74-2 limit the output $V_{d2}$ and the output $V_{d2}$, which are voltage commands, based on the DC voltage minimum value Vdc_min, which is an output of the MIN selector 76-2.

Figure 8:
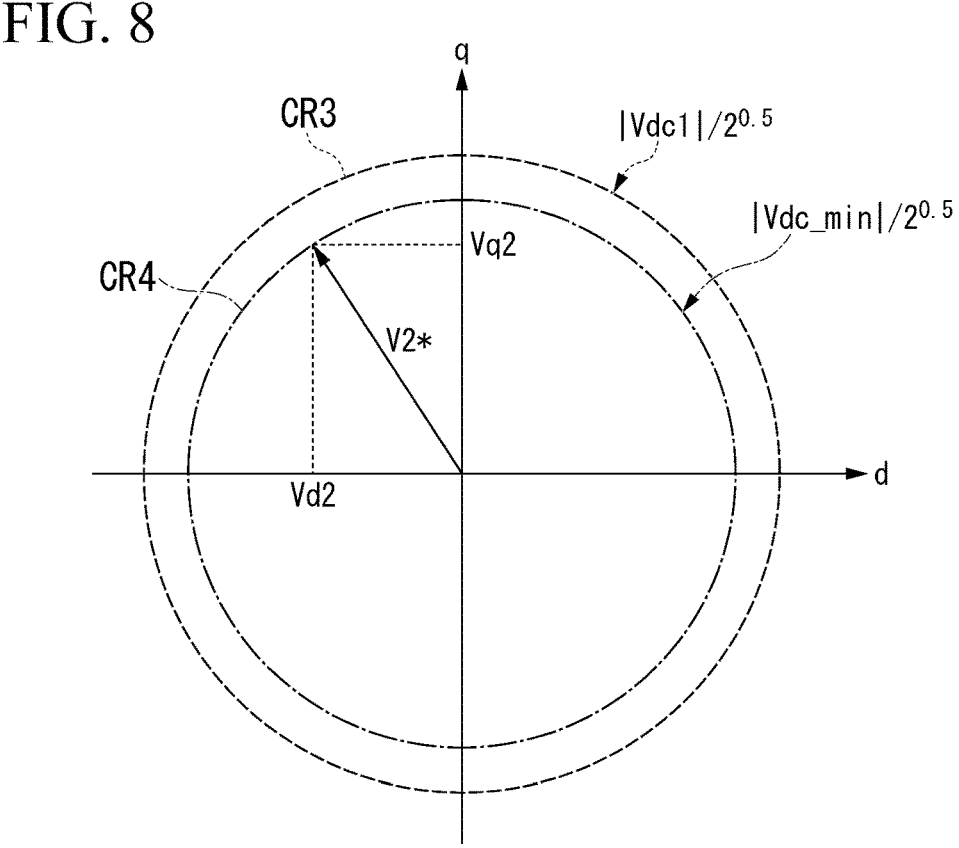
FIG. 8 is a diagram illustrating an example of a voltage command vector in a second system in the first embodiment.

For example, in a case where the first DC voltage Vdc1 is larger than the second DC voltage Vdc2 (Vdc1>Vdc2), a second voltage command vector V2* that has been generated from the output $V_{d2}$ and the output $V_{q2}$ is limited to a circle CR4 (the size falls within |Vdc_min|/$2^{0.5}$) as illustrated in FIG. 8. In this case, the first DC voltage Vdc1 is larger than the second DC voltage Vdc2 (Vdc1>Vdc2), and thus |Vdc_min| is the second DC voltage Vdc2 (|Vdc_min|=Vdc2). Note that in FIG. 8, a circle CR3 represents a circle having a size of |Vdc1|/$2^{0.5}$, in a case where the first DC voltage Vdc1 is used for comparison.

Similarly to the second voltage command vector V2*, the first voltage command vector V1* is limited by the second DC voltage Vdc2. Therefore, as is apparent from FIGS. 7 and 8, the voltage commands ($V_{d1}$, $V_{q1}$) of the first system and the voltage commands ($V_{d2}$, $V_{q2}$) of the second system are equal to each other ($V_{d1}=V_{d2}$ and $V_{q1}=V_{q2}$). Accordingly, to be specific, as effects under the acting condition of the rotating machine 10, in the rotating machine control device 1 according to the embodiment, even though the number of rotations of the rotating machine 10 increases and reaches a voltage saturation region as illustrated in FIG. 9, the mismatch between the systems can be reduced.

Figure 9:
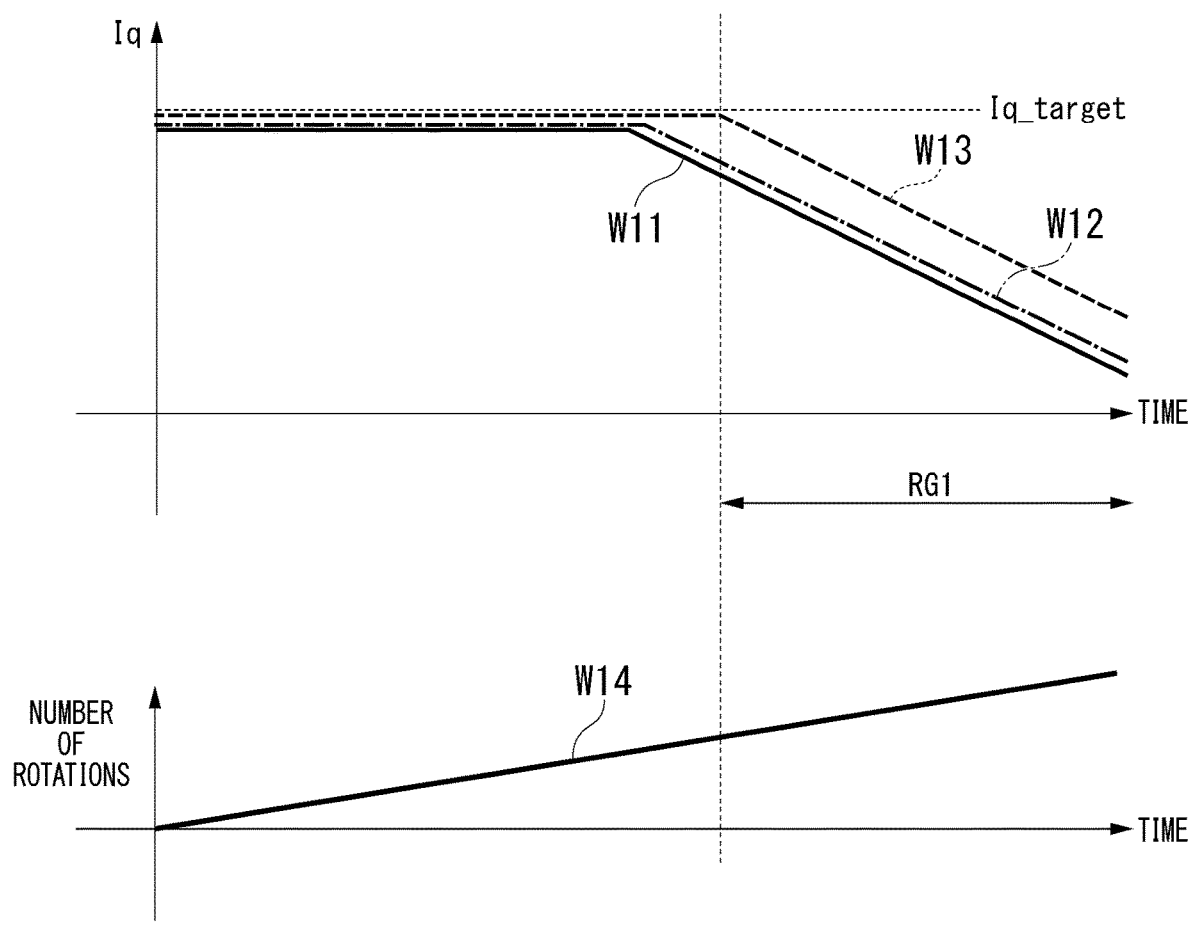
FIG. 9 is a diagram illustrating a relationship between the number of rotations and a q-axis electric current in the first embodiment.

FIG. 9 is a diagram illustrating a relationship between the number of rotations and the q-axis electric current in the present embodiment.

In FIG. 9, the vertical axis represents the q-axis electric current and the number of rotations, and the horizontal axis represents time. In addition, a waveform W11 and a waveform W12 respectively represent the q-axis electric current $I_{d2}$ of the second system and the q-axis electric current $I_{q1}$ of the first system in the present embodiment. Further, a waveform W13 represents the q-axis electric current $I_{q1}$ of the first system in a conventional technique for comparison. In addition, a waveform W14 represents changes in the number of rotations of the rotating machine 10. Further, a region RG1 represents a voltage saturation region.

As illustrated in FIG. 9, the q-axis electric current $I_{q1}$ and the q-axis electric current $I_{q2}$ are respectively limited by the first DC voltage Vdc1 and the second DC voltage Vdc2. Note that in a case where the voltage necessary for causing the electric current to flow to the rotating machine 10 in accordance with a command value exceeds an upper limit value of the applied voltage of each inverter 5, the q-axis electric current $I_{q1}$ and the q-axis electric current $I_{q2}$ each decrease with respect to a target q-axis electric current Iq_target. The region RG1 in which the q-axis electric current $I_{q1}$ and the q-axis electric current $I_{q2}$ decrease with respect to the target q-axis electric current Iq_target will be referred to as a voltage saturation region.

For example, in a case where the first DC voltage Vdc1 is larger than the second DC voltage Vdc2, the q-axis electric current $I_{q1}$ (the waveform W13) is larger than the q-axis electric current $I_{q2}$ (the waveform W11) in the voltage saturation region, in the conventional technique. Therefore, in the conventional technique, it is difficult to equally control the q-axis electric current $I_{q1}$ and the q-axis electric current $I_{q2}$.

In contrast, in the rotating machine control device 1 according to the present embodiment, the electric current controller 72-1 and the electric current controller 74-1 of the first system put limitations by use of the DC voltage minimum value Vdc_min (=Vdc2). Therefore, the voltage commands can be made substantially equal to each other ($V_{d1}\approx V_{d2}$ and $V_{q1}\approx V_{q2}$) also in the voltage saturation region (the region RG1), and the q-axis electric current $I_{q1}$ and the q-axis electric current $I_{q2}$ can be controlled substantially equally (the waveform W11 and the waveform W12).

In addition, similarly in a case where the first DC voltage Vdc1 is smaller than the second DC voltage Vdc2 (Vdc1<Vdc2), the electric current controller 72-1 and the electric current controller 74-2 of the second system put limitations by use of the DC voltage minimum value Vdc_min (=Vdc1), so that the q-axis electric current $I_{q1}$ and the q-axis electric current $I_{d2}$ can be controlled substantially equally.

In this manner, the rotating machine control device 1 according to the present embodiment is capable of reducing the mismatch between the systems (the difference between the electric currents caused to flow to the rotating machine 10).

Further, in the present embodiment, the control signal generator 78-1 of the first system normalizes the voltage command values ($V_{u1}$, $V_{v1}$, $V_{w1}$) on three-phase axes by use of the first DC voltage Vdc1. Further, the control signal generator 78-2 of the second system normalizes the voltage command values ($V_{u2}$, $V_{v2}$, $V_{w2}$) on three-phase axes by use of the second DC voltage Vdc2. Here, effects of normalizing the voltage command values of the own system by use of the DC voltage of the own system will be described.

The controller 7-1 limits the voltage command values ($V_{u1}$, $V_{v1}$, $V_{w1}$) on three-phase axes by use of the DC voltage minimum value Vdc_min. Therefore, usually, also in a case where normalization is conducted by use of the DC voltage minimum value Vdc_min, it is possible to control the rotating machine 10 in a steady state. However, in a transient state (for example, when a sudden change in the q-axis electric current command value Iq_target1 or a sudden change in the rotational speed occurs, or the like), in a case where the voltage command value of the own system is normalized by use of the DC voltage minimum value Vdc_min, it is not possible to output a desired voltage. In a case where the voltage command values ($V_{u1}$, $V_{v1}$, $V_{w1}$) are normalized by use of the DC voltage minimum value Vdc_min, the first duties (du1, dv1, dw1) are obtained in the following equation (9) with the above-described equation (5) as a reference.

[Equation 9]

$$du1 = V_{u1} \times \frac{1}{Vdc\_min} + 0.5$$
$$dv1 = V_{v1} \times \frac{1}{Vdc\_min} + 0.5 \quad (9)$$
$$dw1 = V_{w1} \times \frac{1}{Vdc\_min} + 0.5$$

In addition, the three-phase output voltages (Vu1_PWM, Vv1_PWM, Vw1_PWM) in this case are expressed in the following equation (10) with the above-described equations (6) to (8) as references.

[Equation 10]

$$Vu1\_PWM = V_{u1} \times \frac{Vdc1}{Vdc\_min} + 0.5 \times Vdc1$$
$$Vv1\_PWM = V_{v1} \times \frac{Vdc1}{Vdc\_min} + 0.5 \times Vdc1 \quad (10)$$
$$Vw1\_PWM = V_{w1} \times \frac{Vdc1}{Vdc\_min} + 0.5 \times Vdc1$$

Here, when focusing on the first term on the right side of the equation (10), the three-phase output voltages (Vu1_PWM, Vv1_PWM, Vw1_PWM) are obtained by multiplying original voltage commands by (Vdc1/Vdc_min), and a voltage error occurs. Such a voltage error is absorbed by the electric current controller 72-1 and the electric current controller 72-2, and values are obtained by multiplying the original voltage command values by (Vdc_min/Vdc1) in the steady state. Therefore, the voltage command values ($V_{u1}'$, $V_{v1}'$, $V_{w1}'$) on three-phase axes are expressed in the following equation (11).

[Equation 11]

$$V'_{u1} = V_{u1} \times Vdc\_min/Vdc1$$
$$V'_{v1} = V_{v1} \times Vdc\_min/Vdc1 \quad (11)$$
$$V'_{w1} = V_{w1} \times Vdc\_min/Vdc1$$

As expressed in the equation (11), the voltage error caused by the normalization by use of the DC voltage minimum value Vdc_min is absorbed by the operations of the electric current controller 72-1 and the electric current controller 72-2. However, in the transient state, the influence of the voltage error makes the controller 7-1 and the controller 7-2 difficult to control the rotating machine 10, in a state of having a desired transient characteristic. Therefore, the rotating machine control device 1 according to the present embodiment is capable of achieving the desired transient characteristic, by normalizing the voltage command values of the own system by use of the DC voltage of the own system.

As described heretofore, the rotating machine control device 1 according to the present embodiment includes the inverter 5-1 (the first inverter), the inverter 5-2 (the second inverter), the controller 7-1 (the first controller), and the controller 7-2 (the second controller). The inverter 5-1 applies an AC voltage to the three-phase windings (u1, v1, w1) of the first system, based on the first DC voltage Vdc1 that has been output from the DC power supply 3-1 of the first system. The inverter 5-2 applies an AC voltage to the three-phase windings (u2, v2, w2) of the second system, based on the second DC voltage Vdc2 that has been output from the DC power supply 3-2 of the second system. The controller 7-1 generates a command value to the inverter 5-1, based on the command value (Ts1) of the rotating machine 10, the first DC voltage Vdc1, and the second DC voltage Vdc2. The controller 7-2 generates a command value to the inverter 5-2, based on the command value (Ts1) of the rotating machine 10, the first DC voltage Vdc1, and the second DC voltage Vdc2. In a case where the DC voltage (for example, the first DC voltage Vdc1) of the own system is higher than the DC voltage (for example, the second DC voltage Vdc2) of the other system, the controller 7-1 and the controller 7-2 (the controller 7) each limit the own system voltage commands ($V_{d1}$, $V_{q1}$) related to the voltage applied to the three-phase windings of the own system by use of the DC voltage (for example, the DC voltage minimum value Vdc_min=Vdc2) of the other system, and also generates a value obtained by normalizing the own system voltage command by use of the DC voltage (for example, the first DC voltage Vdc1) of the own system (for example, see the equations (5) and (7)), as a command value to the inverter 5 (for example, the inverter 5-1) of the own system.

Accordingly, as described above, the rotating machine control device 1 according to the present embodiment is capable of reducing the mismatch between the systems, even in a case where a difference occurs between the DC voltages output from the DC power supplies (3-1, 3-2) of a plurality of systems that control the rotating machine 10. That is, the rotating machine control device 1 according to the present embodiment limits the voltage command value of the own system to be applied to the three-phase windings of the own system by use of the DC voltage minimum value Vdc_min, which is a smaller one of the values of the first DC voltage Vdc1 and the second DC voltage Vdc2, and thus is capable of reducing the mismatch between the systems (the difference between the electric currents caused to flow to the rotating machine 10). In addition, the rotating machine control device 1 according to the present embodiment outputs values (the first duties, the second duties) obtained by normalizing the own system voltage command by use of the DC voltage of the own system to the inverters 5 (5-1, 5-2) of the first system and the second system, respectively, and is thus improves the transient characteristic.

In addition, in the present embodiment, the controller 7-1 includes the first CPU, and the controller 7-2 includes the second CPU. The first CPU transmits the first DC voltage Vdc1 (=Vdc1s) to the second CPU, and the second CPU transmits the second DC voltage Vdc2 (=Vdc2s) to the first CPU.

Accordingly, in the rotating machine control device 1 according to the present embodiment, the two independent CPUs perform processing. Therefore, for example, even when one of the systems fails, the other one of the systems is capable of continuing the control of the rotating machine 10.

Further, in the present embodiment, in a case where the DC voltage (for example, the first DC voltage Vdc1) of the own system is higher than the DC voltage (for example, the second DC voltage Vdc2) of the other system, the controller 7 (for example, the controller 7-1) limits the voltage commands ($V_{d1}$, $V_{q1}$) on dq-axes by use of the DC voltage (for example, the DC voltage minimum value Vdc_min=Vdc2) of the other system from among the own system voltage commands.

Accordingly, the rotating machine control device 1 according to the present embodiment is capable of adjusting the voltage commands on the dq-axes to match each other between the systems.

Further, in the present embodiment, in the case where the DC voltage (for example, the first DC voltage Vdc1) of the own system is higher than the DC voltage (for example, the second DC voltage Vdc2) of the other system, the controller 7 (for example, the controller 7-1) may limit the magnitude of the voltage command vector on a stationary coordinate axis, from among the own system voltage commands, to a value that can be output by the DC voltage of the other system (for example, the DC voltage minimum value Vdc_min=Vdc2).

Accordingly, the rotating machine control device 1 according to the present embodiment is capable of adjusting the magnitudes of the voltage command vectors on the stationary coordinate axes to match each other between the systems.

Second Embodiment

Figure 10:
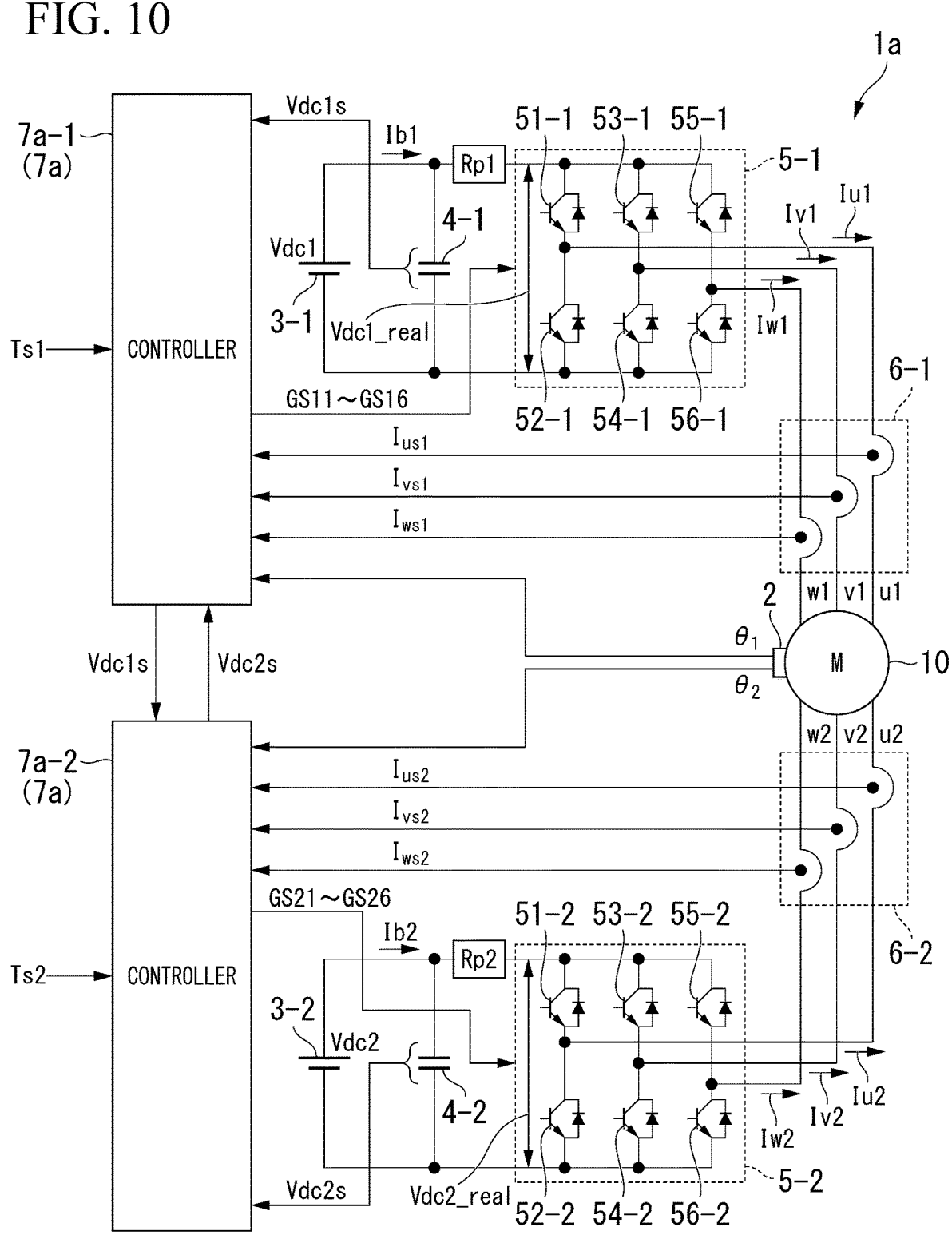
FIG. 10 is a block diagram illustrating an example of a rotating machine control device according to a second embodiment.

Next, a rotating machine control device 1a according to a second embodiment will be described with reference to the drawings. FIG. 10 is a block diagram illustrating an example of the rotating machine control device 1a according to the second embodiment.

As illustrated in FIG. 10, the rotating machine control device 1a includes a position detector 2, a DC power supply 3-1, a DC power supply 3-2, a capacitor 4-1, a capacitor 4-2, an inverter 5-1, an inverter 5-2, an electric current detector 6-1, an electric current detector 6-2, a controller 7a-1, and a controller 7a-2.

Note that in FIG. 10, the same constitutions as those of the first embodiment illustrated in FIG. 1 are denoted by the same reference numbers, and descriptions thereof will be omitted.

The present embodiment is different from the rotating machine control device 1 in the first embodiment in that the rotating machine control device 1a includes controllers 7a (7a-1, 7a-2), instead of the controllers 7 (7-1, 7-2). In addition, in the present embodiment, the first system includes a wiring resistance (Rp1) of a direct-current part that flows from the DC power supply 3-1 to the inverter 5-1, and a real DC voltage at which a voltage drop occurs due to the wiring resistance (Rp1) is set as a first DC voltage Vdc1_real. In addition, the second system includes a wiring resistance (Rp2) of a direct-current part that flows from the DC power supply 3-2 to the inverter 5-2, and a real DC voltage at which a voltage drop occurs due to the wiring resistance (Rp2) is set as a second DC voltage Vdc2_real.

The controller 7a-1 (an example of the first controller) includes, for example, a CPU, and controls the rotating machine 10 by the first system. The controller 7a-1 outputs the control signals GS11 to GS16 (first control signals) related to switching of the inverter 5-1, based on the electric current command values (Id_target1, Iq_target1), the rotational position θ$_1$ that has been detected by the position detector 2, the electric current value I$_{us1}$, the electric current value I$_{vs1}$, and the electric current value I$_{ws1}$ that has been detected by the electric current detector 6-1, the first DC voltage Vdc1s, and the second DC voltage Vdc2s that has been acquired from the controller 7a-2.

The controller 7a-2 (an example of the second controller) includes, for example, a CPU, and controls the rotating machine 10 by the second system. The controller 7a-2 outputs control signals GS21 to GS26 (second control signals) related to switching of the inverter 5-2, based on the electric current command values (Id_target2, Iq_target2), the rotational position θ$_1$ that has been detected by the position detector 2, the electric current value I$_{us2}$, the electric current value I$_{vs2}$, and the electric current value I$_{ws2}$ that have been detected by the electric current detector 6-2, the second DC voltage Vdc2s, and the first DC voltage Vdc1s that have been acquired from the controller 7a-1.

Here, the constitution of the controllers 7a in two systems of the rotating machine control device 1a according to the present embodiment will be described with reference to FIG. 11.

Figure 11:
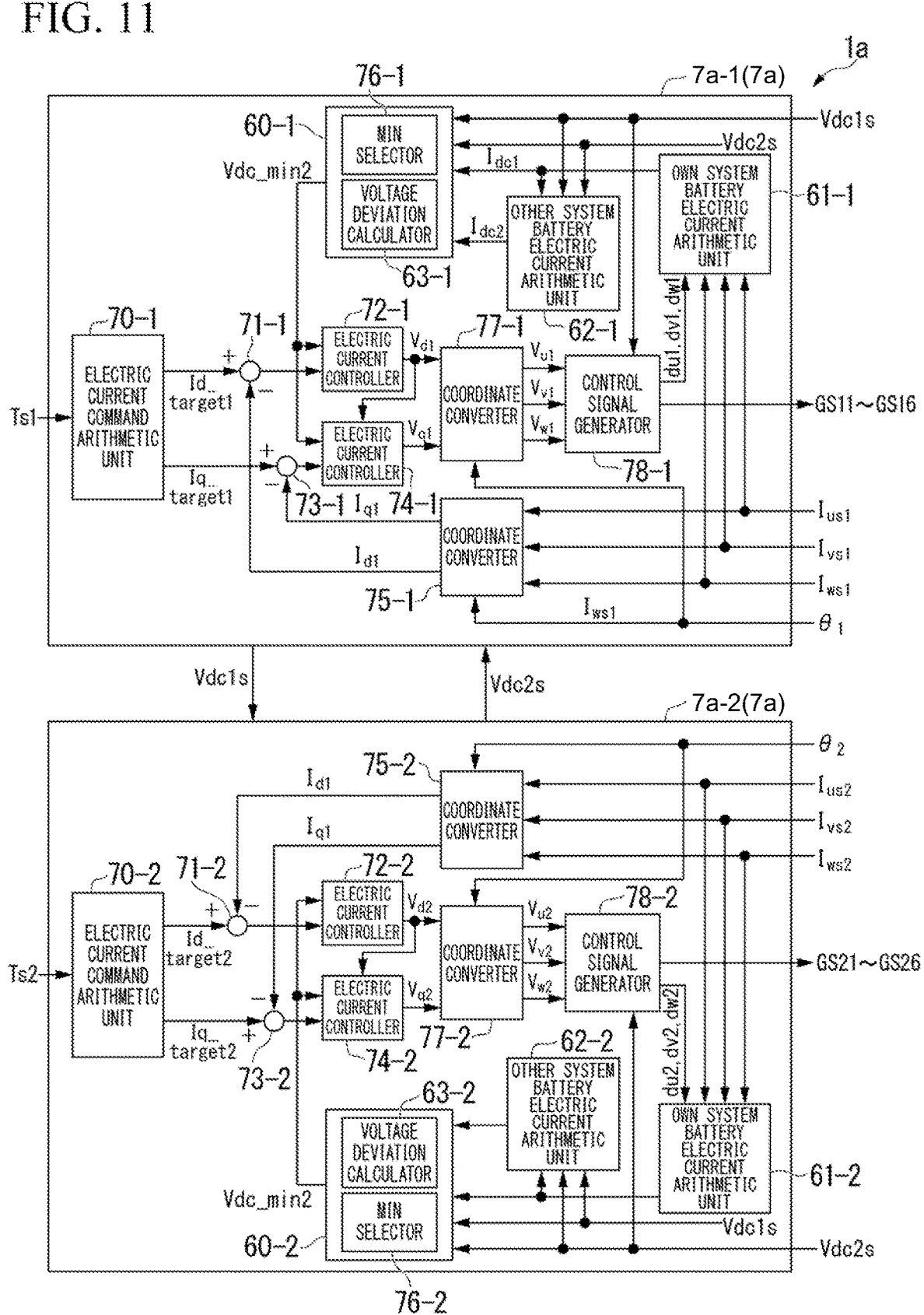
FIG. 11 is a block diagram illustrating an example of controllers in two systems of the rotating machine control device according to the second embodiment.

FIG. 11 is a block diagram illustrating an example of the controllers 7a in two systems of the rotating machine control device 1a according to the present embodiment.

As illustrated in FIG. 11, the controller 7a-1 includes an electric current command arithmetic unit 70-1, a subtractor 71-1, an electric current controller 72-1, a subtractor 73-1, an electric current controller 74-1, a coordinate converter 75-1, a MIN selector 76-1, a coordinate converter 77-1, a control signal generator 78-1, an own system battery electric current arithmetic unit 61-1, an other system battery electric current arithmetic unit 62-1, and a voltage deviation calculator 63-1. Note that the MIN selector 76-1 and the voltage deviation calculator 63-1 are included in a voltage minimum value calculator 60-1.

The own system battery electric current arithmetic unit 61-1 calculates an electric current I$_{dc1}$ of the own system, based on three-phase electric current values (an electric current value I$_{us1}$, an electric current value I$_{vs1}$, and an electric current value I$_{ws1}$) of the own system and first duties (du1, dv1, dw1) that are the duties of the own system. Here, the electric current I$_{dc1}$ of the own system (a DC part electric current of the own system) is an electric current of the DC part to flow into the inverter 5-1, and is a DC part electric current of the first system. The own system battery electric current arithmetic unit 61-1 calculates the electric current I$_{dc1}$ of the own system, by use of, for example, the following equation (12).

[Equation 12]

$$I_{dc1} = du1 \times I_{us1} + dv1 \times I_{vs1} + dw1 \times I_{ws1} \quad (12)$$

The other system battery electric current arithmetic unit 62-1 calculates an electric current I$_{dc2}$ of the other system, based on the electric current I$_{dc1}$ of the own system, a first DC voltage Vdc1s that is a detected value of the DC voltage of the own system, and a second DC voltage Vdc2s that is a detected value of the DC voltage of the other system. Here, the electric current I$_{dc2}$ of the other system (a DC part electric current of the other system) is an electric current of the DC part to flow into the inverter 5-2, and is an electric current of the DC part in the second system. The other system battery electric current arithmetic unit 62-1 calculates the electric current I$_{dc2}$ of the other system, by use of, for example, the following equation (13).

[Equation 13]

$$I_{dc2} = \frac{Vdc1s \times I_{dc1}}{Vdc2s} \quad (13)$$

The voltage deviation calculator 63-1 calculates a voltage deviation $\Delta V_a$ of the first system, based on the electric current $I_{dc1}$ of the own system that has been output from the own system battery electric current arithmetic unit 61-1 and the electric current $I_{dc2}$ of the other system that has been output from the other system battery electric current arithmetic unit 62-1. The voltage deviation calculator 63-1 calculates the voltage deviation $\Delta V_a$ of the first system, by use of, for example, the following equation (14).

[Equation 14]

$$\Delta V_a = R_p(I_{dc2} - I_{dc1}) \tag{14}$$

In the equation (14), a resistance $R_p$ (=Rp1) indicates a wiring resistance of the first system.

In this manner, the voltage deviation $\Delta V_a$ of the first system is a value obtained in such a manner that out of the electric current $I_{dc1}$ of the first system and the electric current $I_{dc2}$ of the second system, the electric current $I_{dc1}$ of the own system is subtracted from the electric current $I_{dc2}$ of the other system, and its subtraction result is multiplied by the wiring resistance $R_p$(=Rp1) indicating the resistance of wiring through which the DC part electric current (the electric current $I_{dc1}$) of the own system flows.

The voltage minimum value calculator 60-1 includes the MIN selector 76-1 and the voltage deviation calculator 63-1. The voltage minimum value calculator 60-1 generates a new DC voltage minimum value Vdc_min2, based on the DC voltage minimum value Vdc_min output from the MIN selector 76-1 and the voltage deviation $\Delta V_a$ of the first system that has been calculated by the voltage minimum value calculator 60-1, and outputs the DC voltage minimum value Vdc_min2 that has been generated. The DC voltage minimum value Vdc_min2 is a correction value of the DC voltage minimum value Vdc_min in which the voltage deviation $\Delta V_a$ has been considered. The voltage minimum value calculator 60-1 calculates the DC voltage minimum value Vdc_min2, by use of, for example, the following equation (15).

[Equation 15]

$$\left.\begin{array}{l} \text{Vdc\_min2} = \text{Vdc\_min}, (Vdc1s < Vdc2s) \\ \text{Vdc\_min2} = \text{Vdc\_min} - \Delta V_a, (Vdc1s > Vdc2s) \end{array}\right\} \tag{15}$$

That is, in a case where the DC voltage Vdc1s of the own system is smaller than the DC voltage Vdc2s of the other system, the voltage minimum value calculator 60-1 outputs the DC voltage minimum value Vdc_min (=Vdc1s) as the DC voltage minimum value Vdc_min2. In addition, in a case where the DC voltage Vdc1s of the own system is larger than the DC voltage Vdc2s of the other system, the voltage minimum value calculator 60-1 outputs a value obtained by subtracting the voltage deviation $\Delta V_a$ from the DC voltage minimum value Vdc_min (=Vdc2s), as the DC voltage minimum value Vdc_min2.

The DC voltage minimum value Vdc_min2 that has been output from the voltage minimum value calculator 60-1 is supplied to the subtractor 71-1 and the subtractor 73-1, instead of the DC voltage minimum value Vdc_min. Since the subsequent processing of the controller 7a-1 is similar to that of the controller 7-1 in the first embodiment, a description thereof is omitted here.

In addition, the controller 7a-2 includes an electric current command arithmetic unit 70-2, a subtractor 71-2, an electric current controller 72-2, a subtractor 73-2, an electric current controller 74-2, a coordinate converter 75-2, a MIN selector 76-2, a coordinate converter 77-2, a control signal generator 78-2, an own system battery electric current arithmetic unit 61-2, an other system battery electric current arithmetic unit 62-2, and a voltage deviation calculator 63-2. Note that the MIN selector 76-2 and the voltage deviation calculator 63-2 are included in a voltage minimum value calculator 60-2.

The own system battery electric current arithmetic unit 61-2 calculates the electric current $I_{dc2}$ of the own system, based on the three-phase electric current values (an electric current value $I_{us2}$, an electric current value $I_{vs2}$, and an electric current value $I_{ws2}$) of the own system and second duties (du2, dv2, dw2) that are the duties of the own system. Here, the electric current $I_{dc2}$ of the own system (a DC part electric current of the own system) is an electric current of the DC part to flow into the inverter 5-2, and is a DC part electric current of the second system. The own system battery electric current arithmetic unit 61-2 calculates the electric current $I_{dc2}$ of the own system, by use of, for example, the following equation (16).

[Equation 16]

$$I_{dc2} = du2 \times I_{us2} + dv2 \times I_{vs2} + dw2 \times I_{ws2} \tag{16}$$

The other system battery electric current arithmetic unit 62-2 calculates the electric current $I_{dc1}$ of the other system, based on the electric current $I_{dc2}$ of the own system, the second DC voltage Vdc2s that is a detected value of the DC voltage of the own system, and the first DC voltage Vdc1s that is a detected value of the DC voltage of the other system. Here, the electric current $I_{dc1}$ of the other system (a DC part electric current of the other system) is an electric current of the DC part to flow into the inverter 5-1, and is an electric current of the DC part in the first system. The other system battery electric current arithmetic unit 62-1 calculates the electric current $I_{dc1}$ of the other system, by use of, for example, the following equation (17).

[Equation 17]

$$I_{dc1} = \frac{Vdc2s \times I_{dc2}}{Vdc1s} \tag{17}$$

The voltage deviation calculator 63-2 calculates a voltage deviation $\Delta V_b$ of the second system, based on the electric current $I_{dc2}$ of the own system that has been output from the own system battery electric current arithmetic unit 61-2 and the electric current $I_{dc1}$ of the other system that has been output from the other system battery electric current arithmetic unit 62-2. The voltage deviation calculator 63-2 calculates the voltage deviation $\Delta V_b$ of the second system, by use of, for example, the following equation (18).

[Equation 18]

$$\Delta V_b = R_p(I_{dc1} - I_{dc2}) \tag{18}$$

In the equation (18), a resistance $R_p$ (=Rp2) represents a wiring resistance of the second system.

In this manner, the voltage deviation $\Delta V_b$ of the second system is a value obtained in such a manner that out of the electric current $I_{dc2}$ of the second system and the electric current $I_{dc1}$ of the first system, the electric current $I_{dc2}$ of the own system is subtracted from the electric current $I_{dc1}$ of the other system, and its subtraction result is multiplied by the wiring resistance $R_p$ (=Rp2) indicating the resistance of wiring through which the DC part electric current (the electric current $I_{dc2}$) of the own system flows.

The voltage minimum value calculator 60-2 includes the MIN selector 76-2 and the voltage deviation calculator 63-2. The voltage minimum value calculator 60-2 generates a new DC voltage minimum value Vdc_min2, based on the DC voltage minimum value Vdc_min output from the MIN selector 76-2 and the voltage deviation $\Delta V_b$ of the second system that has been calculated by the voltage minimum value calculator 60-2, and outputs the DC voltage minimum value Vdc_min2 that has been generated. The DC voltage minimum value Vdc_min2 is a correction value of the DC voltage minimum value Vdc_min in which the voltage deviation $\Delta V_b$ has been considered. The voltage minimum value calculator 60-2 calculates the DC voltage minimum value Vdc_min2, by use of, for example, the following equation (19).

[Equation 19]

$$Vdc\_min2 = Vdc\_min, (Vdc2s < Vdc1s) \brace Vdc\_min2 = Vdc\_min - \Delta V_b, (Vdc2s > Vdc1s)} \quad (19)$$

That is, in a case where the DC voltage Vdc2s of the own system is smaller than the DC voltage Vdc1s of the other system, the voltage minimum value calculator 60-2 outputs the DC voltage minimum value Vdc_min (=Vdc2s) as the DC voltage minimum value Vdc_min2. In addition, in a case where the DC voltage Vdc2s of the own system is larger than the DC voltage Vdc1s of the other system, the voltage minimum value calculator 60-2 outputs a value obtained by subtracting the voltage deviation $\Delta V_b$ from the DC voltage minimum value Vdc_min (=Vdc1s), as the DC voltage minimum value Vdc_min2.

The DC voltage minimum value Vdc_min2 that has been output from the voltage minimum value calculator 60-2 is supplied to the subtractor 71-2 and the subtractor 73-2, instead of the DC voltage minimum value Vdc_min. The subsequent processing of the controller 7a-2 is similar to that of the controller 7-2 in the first embodiment.

Next, actions and effects of the rotating machine control device 1a according to the present embodiment will be described.

In the present embodiment, the presence of the wiring resistances (Rp1, Rp2) of the inverter 5 causes a voltage drop in the DC voltage, in comparison with the first embodiment. Note that here it is assumed that Rp1=Rp2=$R_p$.

In the inverter 5-1, since the wiring resistance $R_p$ is present, a deviation occurs between the detected voltage Vdc1s of the own system and the real input voltage Vdc1_real. In addition, in the inverter 5-2, since the wiring resistance $R_p$ is present, a deviation occurs between the detected voltage Vdc2s of the own system and the real input voltage Vdc2_real. Therefore, in order to match electric currents of the first system and the second system caused to flow to the rotating machine 10, it is necessary for the inverter 5-1 and the inverter 5-2 to apply a voltage based on a smaller voltage of the real input voltage Vdc1_real and the real input voltage Vdc2_real.

However, detectable voltages in reality are the detected voltage Vdc1s and the detected voltage Vdc2s, and thus an error occurs. Therefore, the rotating machine control device 1a according to the present embodiment corrects such an error by use of the voltage deviation calculator 63-1 and the voltage deviation calculator 63-2.

In the present embodiment, the rotating machine control device 1a conducts control so that the electric power supplied by the inverter 5-1 and the electric power supplied the inverter 5-2 to the rotating machine 10 match each other, and the following equation (20) is established.

[Equation 20]

$$Vdc1s \times I_{dc1} = Vdc2s \times I_{dc2} \quad (20)$$

In addition, the following equation (21) is established from the voltage drop in the first system and the second system of the rotating machine control device 1a in FIG. 10.

[Equation 21]

$$Vdc1\_real = Vdc1s - R_p \cdot I_{dc1} \brace Vdc2\_real = Vdc2s - R_p \cdot I_{dc2}} \quad (21)$$

First, for comparison, a case where the correction by use of the voltage deviation $\Delta V_a$ is not conducted will be described.

For example, in a case where the detected voltage Vdc1s of the first system is larger than the detected voltage Vdc2s of the second system (Vdc1s>Vdc2s), the electric current $I_{dc1}$ of the first system is smaller than the electric current $I_{dc2}$ of the second system by the above-described equation (13) ($I_{dc1} < I_{dc2}$). Here, in the second system, the input voltage Vdc2_real expressed in the above-described equation (21) is output to the inverter 5-2.

In contrast, in the first system, since the MIN selector 76-1 selects the voltage Vdc2s as the DC voltage minimum value Vdc_min, the input voltage Vdc1_real expressed in the following equation (22) is output to the inverter 5-1.

[Equation 22]

$$Vdc1\_real = Vdc2s - R_p \cdot I_{dc1} \quad (22)$$

Here, in the case where the detected voltage Vdc1s of the first system is larger than the detected voltage Vdc2s of the second system (Vdc1s>Vdc2s), the electric current $I_{dc1}$ of the first system is smaller than the electric current $I_{dc2}$ of the second system ($I_{dc1} < I_{dc2}$). Therefore, the relationship of the following equation (23) is established.

[Equation 23]

$$Vdc1\_real > Vdc2\_real \quad (23)$$

That is, in the case where the correction by use of the voltage deviation $\Delta V_a$ is not conducted in the present embodiment, the voltage (the input voltage Vdc1_real) applied to the inverter 5-1 and the voltage (the input voltage Vdc2_real) applied to the inverter 5-2 do not match each other. Therefore, the electric current caused to flow to the three-phase windings (u1, v1, w1) of the first system and the electric current caused to flow to the three-phase windings (u2, v2, w2) of the second system do not match each other, and noise may be generated in the rotating machine 10, for example.

In contrast, in the rotating machine control device 1a according to the present embodiment, the voltage minimum value calculator 60-1 corrects the DC voltage minimum value Vdc_min by use of the voltage deviation $\Delta V_a$ expressed in the equation (14), so that the voltage (the input voltage Vdc1_real) applied to the inverter 5-1 is expressed in the following equation (24).

[Equation 24]

$$Vdc1\_real = Vdc2s - \Delta V_a - R_p \cdot I_{dc1} \quad (24)$$
$$= Vdc2s - R_p \cdot (I_{dc2} - I_{dc1}) - R_p \cdot I_{dc1}$$
$$= Vdc2s - R_p \cdot I_{dc2}$$

The right side of the equation (24) is identical to the input voltage Vdc2_real expressed in the above-described equation (21). Therefore, in the rotating machine control device 1a according to the present embodiment, the voltage (the input voltage Vdc1_real) applied to the inverter 5-1 matches the voltage (the input voltage Vdc2_real) applied to the inverter 5-2.

Next, in a case where the detected voltage Vdc1s of the first system is smaller than the detected voltage Vdc2s of the second system (Vdc1s<Vdc2s), the electric current $I_{dc1}$ of the first system is larger than the electric current $I_{dc2}$ of the second system by the above-described equation (13) ($I_{dc1}>I_{dc2}$). Here, in the first system, the input voltage Vdc1_real expressed in the above-described equation (21) is output to the inverter 5-1.

In contrast, in the second system, since the MIN selector 76-2 selects the voltage Vdc1s as the DC voltage minimum value Vdc_min, the input voltage Vdc2_real expressed in the following equation (25) is output to the inverter 5-2.

[Equation 23]

$$Vdc2\_real = Vdc1s - R_p I_{dc2} \quad (25)$$

Here, in the case where the detected voltage Vdc1s of the first system is smaller than the detected voltage Vdc2s of the second system (Vdc1s<Vdc2s), the electric current $I_{dc1}$ of the first system is larger than the electric current $I_{dc2}$ of the second system ($I_{dc1}>I_{dc2}$). Therefore, the relationship of the following equation (26) is established.

[Equation 23]

$$Vdc1\_real < Vdc2\_real \quad (26)$$

That is, in the case where the correction by use of the voltage deviation $\Delta V_b$ is not conducted in the present embodiment, the voltage (the input voltage Vdc1_real) applied to the inverter 5-1 and the voltage (the input voltage Vdc2_real) applied to the inverter 5-2 do not match each other. Therefore, the electric current caused to flow to the three-phase windings (u1, v1, w1) of the first system and the electric current caused to flow to the three-phase windings (u2, v2, w2) of the second system do not match each other, and noise may be generated in the rotating machine 10, for example.

In contrast, in the rotating machine control device 1a according to the present embodiment, the voltage minimum value calculator 60-2 corrects the DC voltage minimum value Vdc_min by use of the voltage deviation $\Delta V_b$ expressed in the equation (14), so that the voltage (the input voltage Vdc2_real) applied to the inverter 5-2 is expressed in the following equation (27).

[Equation 27]

$$Vdc2\_real = Vdc1s - \Delta V_b - R_p \cdot I_{dc2} \quad (27)$$
$$= Vdc1s - R_p \cdot (I_{dc1} - I_{dc2}) - R_p \cdot I_{dc2}$$
$$= Vdc1s - R_p \cdot I_{dc1}$$

The right side of the equation (27) is identical to the input voltage Vdc1_real expressed in the above-described equation (21). Therefore, in the rotating machine control device 1a according to the present embodiment, the voltage (the input voltage Vdc1_real) applied to the inverter 5-1 matches the voltage (the input voltage Vdc2_real) applied to the inverter 5-2.

As described heretofore, in the rotating machine control device 1a according to the present embodiment, the controller 7a limits the own system voltage command, based on the voltage deviations ($\Delta V_a$, $\Delta V_b$), in the case where the DC voltage of the own system is higher than the DC voltage of the other system. Here, the voltage deviations ($\Delta V_a$, $\Delta V_b$) are each a value obtained in such a manner that out of the DC part electric current (the electric current $I_{dc1}$) of the first system that is the electric current of the DC part to flow into the inverter 5-1 and the DC part electric current (the electric current $I_{dc2}$) of the second system that is the electric current of the DC part to flow into the inverter 5-2, the DC part electric current of the own system is subtracted from the DC part electric current of the other system, and its subtraction result is multiplied by the wiring resistance ($R_p$) indicating the resistance of wiring through which the DC part electric current of the own system flows (see the equations (14) and (18)).

Accordingly, as described above, also in the case where the wiring resistance $R_p$ of the inverter 5 is present, the rotating machine control device 1a according to the present embodiment is capable of matching the voltages output from the inverter 5-1 and the inverter 5-2, and is capable of reducing the mismatch between the systems. In the rotating machine control device 1a according to the present embodiment, since the electric currents caused to flow to the three-phase windings (u1, v1, w1) of the first system and the electric currents caused to flow to the three-phase windings (u2, v2, w2) of the second system match each other, the noise generated from the rotating machine 10 can be reduced, for example.

In addition, in the present embodiment, the controller 7a calculates the DC part electric current of the other system, based on the DC voltage of the other system.

Accordingly, the rotating machine control device 1a according to the present embodiment calculates the DC part electric current of the other system. This eliminates the need to detect the DC part electric current of the other system. Therefore, in the rotating machine control device 1a according to the present embodiment, for example, the number of detectors such as sensors can be reduced, the constitution can be simplified, and cost reduction can be achieved.

In addition, in the present embodiment, the controller 7a calculates the DC part electric current of the other system, based on the DC voltage of the own system, the DC voltage of the other system, and the direct current of the own system (see the equations (13) and (17)).

Accordingly, the rotating machine control device 1a according to the present embodiment is capable of easily calculating the DC part electric current of the other system in a simple method.

Further, the rotating machine control device 1a according to the present embodiment includes the electric current detectors 6 (6-1, 6-2) for detecting the electric currents, which respectively flow through the three-phase windings of the respective systems. The controller 7a calculates the direct current of the own system, based on the electric currents, which respectively flow through the three-phase windings of the own system that have been detected by the electric current detector 6 (see the equations (12) and (16)).

Accordingly, the rotating machine control device 1a according to the present embodiment is capable of easily calculating the DC part electric current of the own system in a simple method.

Note that in the present embodiment described above, the voltage minimum value calculator 60-1 of the first system may receive, from the other system, and use the battery electric current $I_{dc2}$ of the other system that has been calculated, by use of the above-described equation (13) or (14) in the other system. In addition, the voltage minimum value calculator 60-2 of the second system may receive, from the other system, and use the battery electric current $I_{dc1}$ of the other system that has been calculated, by use of the above-described equation (12) or (17) in the other system.

Third Embodiment

Next, a rotating machine control device 1b according to a third embodiment will be described with reference to the drawings.

In the present embodiment, a description will be given with regard to a modification in which the voltage of the own system in each phase of three phases is corrected, based on a zero-phase voltage of the own system.

The rotating machine control device 1b according to the present embodiment includes control signal generators 78a (78a-1, 78a-2), instead of the control signal generators 78 (78-1, 78-2). The other constitutions are similar to those of the rotating machine control device 1 in the first embodiment.

Figure 12:
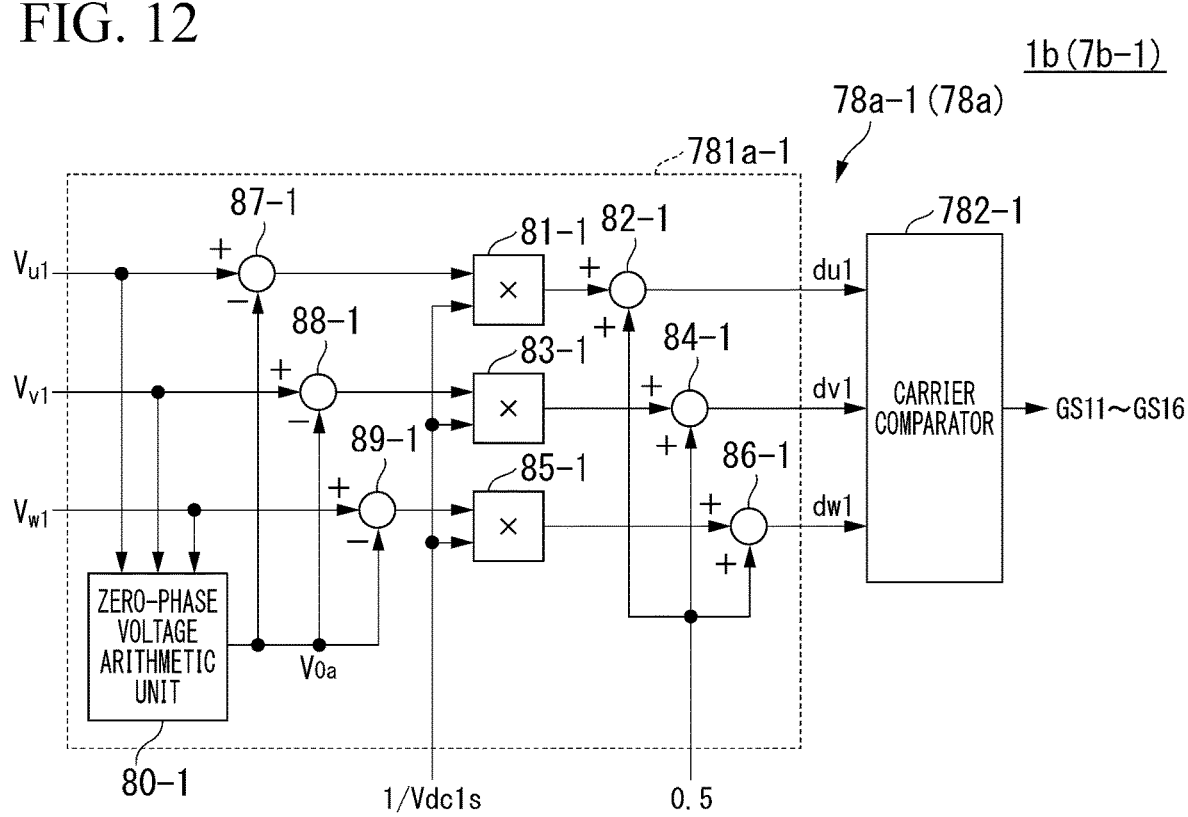
FIG. 12 is a block diagram illustrating an example of a control signal generator in a first system in a third embodiment.

FIG. 12 is a block diagram illustrating an example of the control signal generator 78a-1 of the first system in the present embodiment.

As illustrated in FIG. 12, the control signal generator 78a-1 includes a duty arithmetic unit 781a-1 and a carrier comparator 782-1. Note that in FIG. 12, the same constitutions as those in FIG. 5 described above are denoted by the same reference numbers, and descriptions thereof will be omitted.

The control signal generator 78a-1 outputs the control signals GS11 to GS16 of the inverter 5-1, based on the first DC voltage Vdc1s, and the voltage $V_{u1}$, the voltage $V_{v1}$, and the voltage $V_{w1}$, which are voltage command values on three-phase axes.

Note that the rotating machine control device 1b according to the present embodiment includes the controller 7b-1 of the first system, and the controller 7b-1 includes the control signal generator 78a-1.

The duty arithmetic unit 781a-1 outputs first duties (du1, dv1, dw1) that are values obtained by respectively normalizing by use of the first DC voltage Vdc1s, based on the voltage $V_{u1}$, the voltage $V_{v1}$, and the voltage $V_{w1}$. The duty arithmetic unit 781a-1 includes a zero-phase voltage arithmetic unit 80-1, a multiplier 81-1, an adder 82-1, a multiplier 83-1, an adder 84-1, a multiplier 85-1, an adder 86-1, a subtractor 87-1, a subtractor 88-1, and a subtractor 89-1. Note that the duty arithmetic unit 781a-1 is different from the duty arithmetic unit 781-1 in the first embodiment in that the zero-phase voltage arithmetic unit 80-1, the subtractor 87-1, the subtractor 88-1, and the subtractor 89-1 are added.

The zero-phase voltage arithmetic unit 80-1 calculates a zero-phase voltage $V_{0a}$, based on the voltage $V_{u1}$, the voltage $V_{v1}$, and the voltage $V_{w1}$, which are voltage command values, and the detected voltage Vdc1s of the own system. The zero-phase voltage arithmetic unit 80-1 calculates the zero-phase voltage $V_{0a}$, by use of, for example, the following equation (28). Note that the zero-phase voltage arithmetic unit 80-1 calculates the zero-phase voltage $V_{0a}$ of the own system so that the minimum one of the own system voltage commands (the voltage $V_{u1}$, the voltage $V_{v1}$, and the voltage $V_{w1}$) matches a predetermined lower limit value (for example, 0 V) based on the DC voltage Vdc1s of the own system.

[Equation 28]

$$V_{0a} = V_{min} + \frac{Vdc1s}{2} \qquad (28)$$

Here, the minimum voltage $V_{min}$ is the minimum value of the voltage $V_{u1}$, the voltage $V_{v1}$, and the voltage $V_{w1}$ at the time of calculating the zero-phase voltage $V_{0a}$.

The zero-phase voltage arithmetic unit 80-1 calculates the zero-phase voltage $V_{0a}$ of the own system by adding a value of ½ (Vdc1s/2) of the DC voltage Vdc1s of the own system to the minimum voltage $V_{min}$ so that the minimum one (the minimum voltage $V_{min}$) of the own system voltage commands (the voltage $V_{u1}$, the voltage $V_{v1}$, and the voltage $V_{w1}$) matches a predetermined lower limit value (for example, 0 V) based on the DC voltage Vdc1s of the own system.

The subtractor 87-1 outputs, to the multiplier 81-1, a value obtained by subtracting the zero-phase voltage $V_{0a}$ from the voltage $V_{u1}$, which is the voltage command value.

The subtractor 88-1 outputs, to the multiplier 83-1, a value obtained by subtracting the zero-phase voltage $V_{0a}$ from the voltage $V_{v1}$, which is the voltage command value.

The subtractor 89-1 outputs, to the multiplier 85-1, a value obtained by subtracting the zero-phase voltage $V_{0a}$ from the voltage $V_{w1}$, which is the voltage command value.

Since the constitutions on subsequent stages of the subtractor 87-1, the subtractor 88-1, and the subtractor 89-1 are similar to those in the first embodiment, descriptions thereof are omitted here.

The duty arithmetic unit 781a-1 calculates the first duties (du1, dv1, dw1) by use of the following equation (29).

[Equation 29]

$$\begin{aligned} du1 &= (V_{u1} - V_{0a}) \times \frac{1}{Vdc1s} + 0.5 \\ dv1 &= (V_{v1} - V_{0a}) \times \frac{1}{Vdc1s} + 0.5 \\ dw1 &= (V_{w1} - V_{0a}) \times \frac{1}{Vdc1s} + 0.5 \end{aligned} \qquad (29)$$

Next, a constitution of the control signal generator 78a-2 of the second system will be described with reference to FIG. 13.

Figure 13:
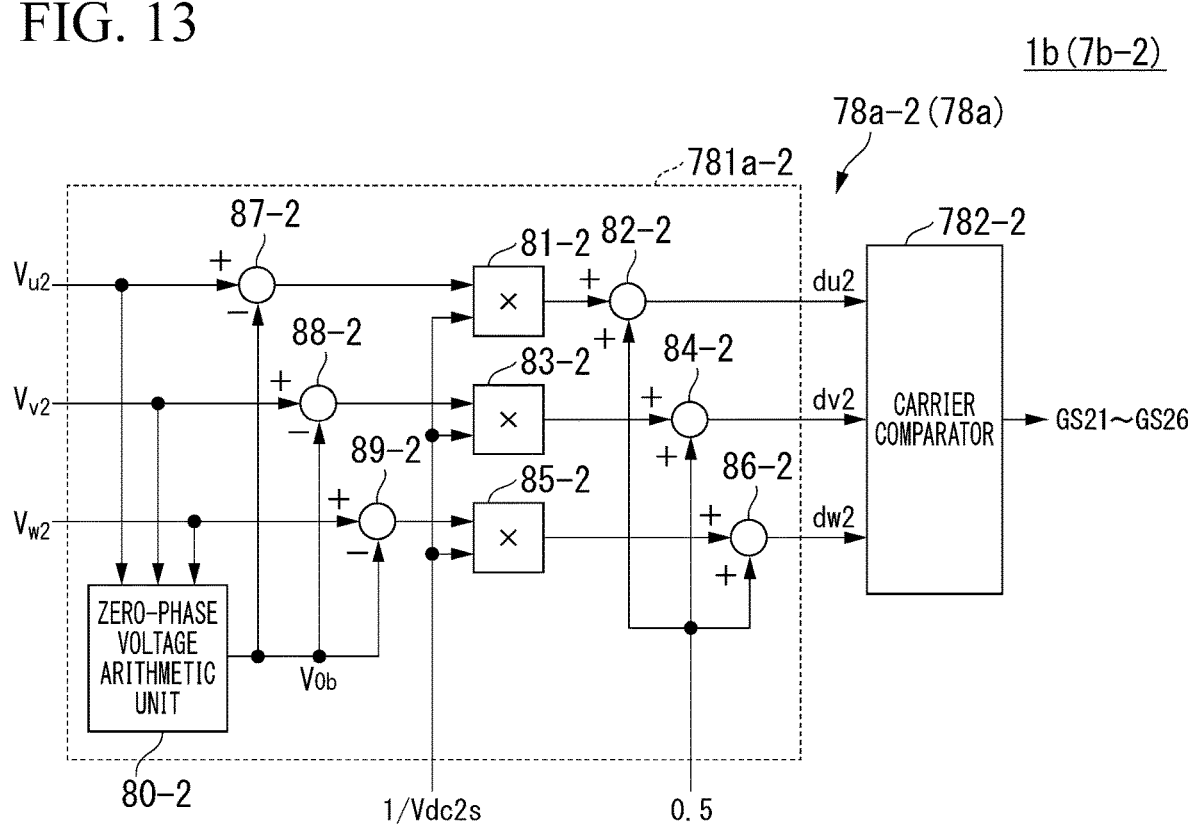
FIG. 13 is a block diagram illustrating an example of a control signal generator in a second system in the third embodiment.

FIG. 13 is a block diagram illustrating an example of the control signal generator 78a-1 of the second system in the present embodiment.

As illustrated in FIG. 13, the control signal generator 78a-2 includes a duty arithmetic unit 781a-2 and a carrier comparator 782-2.

The control signal generator 78a-2 outputs the control signals GS21 to GS26 of the inverter 5-2, based on the second DC voltage Vdc2s, and the voltage $V_{u2}$, the voltage $V_{v2}$, and the voltage $V_{w2}$, which are voltage command values on three-phase axes.

Note that the rotating machine control device 1b according to the present embodiment includes the controller 7b-2 of the second system, and the controller 7b-2 includes the control signal generator 78a-2.

The duty arithmetic unit 781a-2 outputs second duties (du2, dv2, dw2) that are values obtained by respectively normalizing by use of the second DC voltage Vdc2s, based on the voltage $V_{u2}$, the voltage $V_{v2}$, and the voltage $V_{w2}$. The duty arithmetic unit 781a-2 includes a zero-phase voltage arithmetic unit 80-2, a multiplier 81-2, an adder 82-2, a multiplier 83-2, an adder 84-2, a multiplier 85-2, an adder 86-2, a subtractor 87-2, a subtractor 88-2, and a subtractor 89-2. Note that the duty arithmetic unit 781a-2 is different from the duty arithmetic unit 781-2 in the first embodiment in that the zero-phase voltage arithmetic unit 80-2, the subtractor 87-2, the subtractor 88-2, and the subtractor 89-2 are added.

The zero-phase voltage arithmetic unit 80-2 calculates the zero-phase voltage $V_{0b}$, based on the voltage $V_{u2}$, the voltage $V_{v2}$, and the voltage $V_{w2}$, which are voltage command values, and the detected voltage Vdc2s of the own system. The zero-phase voltage arithmetic unit 80-2 calculates the zero-phase voltage $V_{0a}$, by use of, for example, the following equation (30). Note that the zero-phase voltage arithmetic unit 80-1 calculates the zero-phase voltage $V_{0b}$ of the own system so that the minimum one of the own system voltage commands (the voltage $V_{u2}$, the voltage $V_{v2}$, and the voltage $V_{w2}$) matches a predetermined lower limit value (for example, 0 V) based on the DC voltage Vdc2s of the own system.

[Equation 30]

$$V_{0b} = V_{min} + \frac{Vdc2s}{2} \quad (30)$$

Here, the minimum voltage $V_{min}$ is the minimum value of the voltage $V_{u2}$, the voltage $V_{v2}$, and the voltage $V_{w2}$ at the time of calculating the zero-phase voltage $V_{0b}$.

The zero-phase voltage arithmetic unit 80-2 calculates the zero-phase voltage $V_{0b}$ of the own system by adding a value of ½ (Vdc2s/2) of the DC voltage Vdc2s of the own system to the minimum voltage $V_{min}$ so that the minimum one (the minimum voltage $V_{min}$) of the own system voltage commands (the voltage $V_{u2}$, the voltage $V_{v2}$, and the voltage $V_{w2}$) matches a predetermined lower limit value (for example, 0 V) based on the DC voltage Vdc2s of the own system.

The subtractor 87-2 outputs, to the multiplier 81-2, a value obtained by subtracting the zero-phase voltage $V_{0b}$ from the voltage $V_{u2}$, which is the voltage command value.

The subtractor 88-2 outputs, to the multiplier 83-2, a value obtained by subtracting the zero-phase voltage $V_{0b}$ from the voltage $V_{v2}$, which is the voltage command value.

The subtractor 89-2 outputs, to the multiplier 85-2, a value obtained by subtracting the zero-phase voltage $V_{0b}$ from the voltage $V_{w2}$, which is the voltage command value.

Therefore, the duty arithmetic unit 781a-2 calculates the second duties (du2, dv2, dw2), by use of the following equation (31).

[Equation 31]

$$\begin{aligned} du2 &= (V_{u2} - V_{0b}) \times \frac{1}{Vdc2s} + 0.5 \\ dv2 &= (V_{v2} - V_{0b}) \times \frac{1}{Vdc2s} + 0.5 \\ dw2 &= (V_{w2} - V_{0b}) \times \frac{1}{Vdc2s} + 0.5 \end{aligned} \quad (31)$$

Next, actions and effects of the rotating machine control device 1b according to the present embodiment will be described.

In the rotating machine control device 1b according to the present embodiment, the duty arithmetic unit 781a-1 and the duty arithmetic unit 781a-2 respectively calculate the zero-phase voltages ($V_{0a}$, $V_{0b}$) by the equations (28) and (30) by use of the detected voltages (Vdc1s, Vdc2s) of the own system, and subtract the zero-phase voltage from the voltage command value to shift down the duty value within a range in which the voltage is not saturated. Note that in the description here, since the controller 7b-1 of the first system and the controller 7b-2 of the second system have an identical constitution, "−1" and "−2" of reference numbers indicating the respective systems, suffixes "1" and "2", and [a] and [b] at the zero-phase voltage will be omitted.

In a case where it is assumed that a voltage Vdc' is the detected voltage at the time of calculating the zero-phase voltage $V_0$, the zero-phase voltage $V_0$ is expressed in the following equation (32).

[Equation 32]

$$V_0 = V_{min} + \frac{Vdc'}{2} \quad (32)$$

In addition, new voltage command values ($V_u'$, $V_v''$, $V_w'$), which are obtained by subtracting the zero-phase voltage $V_0$ expressed in the equation (32) from the voltage command values ($V_u$, $V_v$, $V_w$), are expressed in the following equation (33).

[Equation 33]

$$\begin{aligned} V_u' &= V_u - V_0 = V_u - \left(V_{min} + \frac{Vdc'}{2}\right) \\ V_v' &= V_v - V_0 = V_v - \left(V_{min} + \frac{Vdc'}{2}\right) \\ V_w' &= V_w - V_0 = V_w - \left(V_{min} + \frac{Vdc'}{2}\right) \end{aligned} \quad (33)$$

Here, it is assumed that the voltage command value $V_u$ is the minimum value of the voltage command values ($V_u$, $V_v$, $V_w$), the minimum value $V_{min}$ is the voltage command value $V_u$. Therefore, the new voltage command value $V_u'$ is expressed in the following equation (34).

[Equation 34]

$$V_u' = V_{min} - \left(V_{min} + \frac{Vdc'}{2}\right) = -\frac{Vdc'}{2} \quad (34)$$

Next, in a case where the new voltage command value $V_u'$ is used, a duty du' is expressed in the following equation (35).

[Equation 35]

$$du' = \frac{V_u'}{Vdc} + 0.5 = \frac{-\frac{Vdc'}{2}}{Vdc} + 0.5 \quad (35)$$

Here, in a case where the detected voltage Vdc' using the value on the other system side is not equal to the DC voltage Vdc (Vdc'≠Vdc), the duty du' is expressed in the following equation (36). In consideration of the duties of the other phases in a similar manner, the duties of the respective phases have waveforms as illustrated in FIG. 14.

[Equation 36]

$$du' = -\frac{1}{2}\left(\frac{Vdc'}{Vdc}\right) + 0.5 \neq 0 \quad (36)$$

Figure 14:
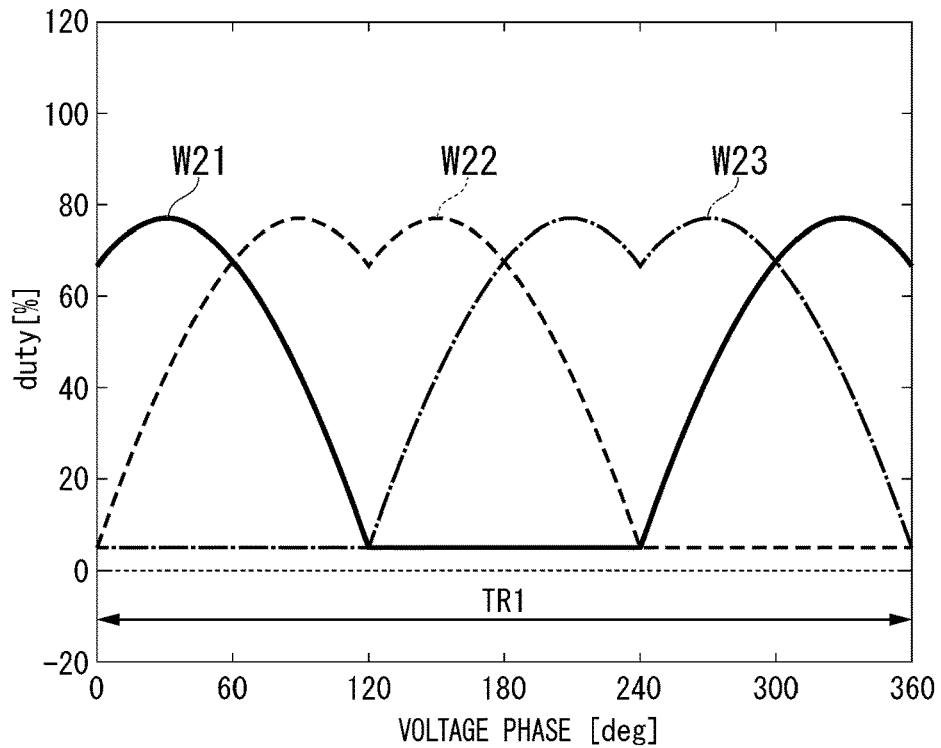
FIG. 14 is a diagram illustrating duty waveforms of the respective phases, in a case where a detected voltage of the other system is used in the third embodiment.

FIG. 14 is a diagram illustrating duty waveforms of the respective phases, in a case where a detected voltage of the other system is used in the present embodiment.

In FIG. 14, in the graph, the horizontal axis represents voltage phase and the vertical axis represents duty. In addition, a waveform W21, a waveform W22, and a waveform W23 respectively represent a U-phase duty waveform, a V-phase duty waveform, and a W-phase duty waveform. Further, a period TR1 represents a period of three-phase switching all the time.

As illustrated in FIG. 14, in a case where the detected voltage Vdc' uses a value on the other system side, the controller 7*b* conducts control of performing the three-phase switching all the time.

Figure 15:
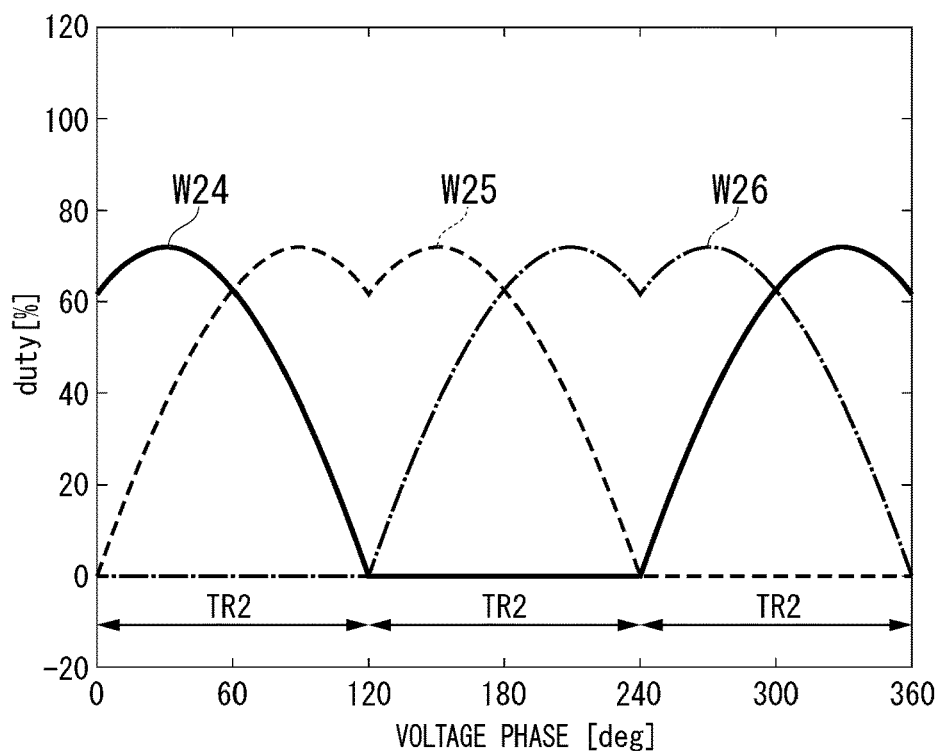
FIG. 15 is a diagram illustrating duty waveforms of the respective phases, in a case where a detected voltage of the own system is used in the third embodiment.

Next, in a case where the detected voltage Vdc' using the value on the own system side is equal to the DC voltage Vdc (Vdc'=Vdc), the duty du' is expressed in the following equation (37). In consideration of the duties of the other phases in a similar manner, the duties of the respective phases have waveforms as illustrated in FIG. 15.

[Equation 37]

$$du' = -\frac{1}{2} + 0.5 = 0 \quad (37)$$

As expressed in the equation (37), the minimum one of the three-phase duties is always equal to "0". Thus, in such a phase, the switching element on an upper arm side (high potential side) is always in ON state.

FIG. 15 is a diagram illustrating duty waveforms of the respective phases, in a case where a detected voltage of the own system is used in the present embodiment.

In FIG. 15, in the graph, the horizontal axis represents voltage phase and the vertical axis represents duty. In addition, a waveform W24, a waveform W25, and a waveform W26 respectively represent a U-phase duty waveform, a V-phase duty waveform, and a W-phase duty waveform. In addition, a period TR2 represents a period of two-phase switching all the time.

As illustrated in FIG. 15, in the case where a value on the own system side is used for the detected voltage Vdc', the controller 7*b* conducts control of performing the two-phase switching all the time. That is, the rotating machine control device 1*b* according to the present embodiment performs the two-phase switching all the time, by use of the detected voltage Vdc of the own system at the time of calculating the zero-phase voltage $V_0$. Accordingly, the rotating machine control device 1*b* according to the present embodiment is capable of reducing a switching loss and improving the electric current detection accuracy, as compared with the case of using the detected voltage of the other system.

As described heretofore, in the rotating machine control device 1*b* according to the present embodiment, the controller 7*b* calculates the zero-phase voltages ($V_{0a}$, $V_{0b}$) of the own system, based on the DC voltage of the own system, and corrects the own system voltage command of each phase, based on the zero-phase voltages ($V_{0a}$, $V_{0b}$) of the own system.

Accordingly, in the rotating machine control device 1*b* according to the present embodiment, two-phase modulation (the two-phase switching all the time) can be performed, and the influence of noise in the electric current detection can be reduced.

In addition, in the present embodiment, the controller 7*b* calculates the zero-phase voltage of the own system so that the minimum one of the own system voltage commands matches a predetermined lower limit value based on the DC voltage of the own system.

Accordingly, the rotating machine control device 1*b* according to the present embodiment is capable of appropriately shifting down the duty value within the range in which the voltage is not saturated.

Fourth Embodiment

Next, a rotating machine control device 1*c* according to a fourth embodiment will be described with reference to the drawings.

In the present embodiment, a description will be given with regard to another modification in which the own system voltage in each phase of the three phases is corrected, based on a zero-phase voltage of the own system. In the third embodiment described above, the zero-phase voltage has been calculated from the minimum value of the own system voltage of each phase. However, in the present embodiment, the zero-phase voltage is calculated from the maximum value of the own system voltage in each phase.

The rotating machine control device 1*c* according to the present embodiment includes control signal generators 78*b* (78*b*-1, 78*b*-2), instead of the control signal generators 78*a* (78*a*-1, 78*a*-2). The other constitutions are similar to those of the rotating machine control device 1*a* in the second embodiment.

Figure 16:
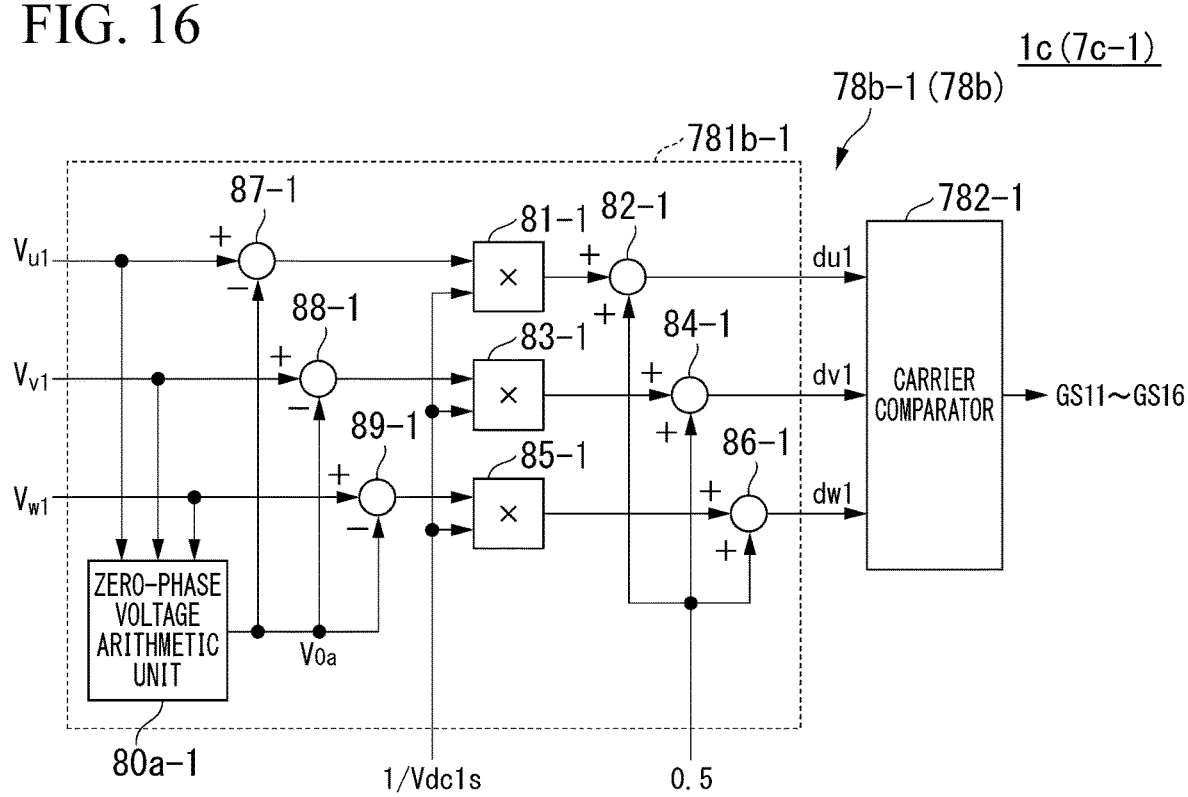
FIG. 16 is a block diagram illustrating an example of a control signal generator in a first system in a fourth embodiment.

FIG. 16 is a block diagram illustrating an example of the control signal generator 78*b*-1 of the first system in the present embodiment.

As illustrated in FIG. 16, the control signal generator 78*b*-1 includes a duty arithmetic unit 781*b*-1 and a carrier comparator 782-1. Note that in FIG. 16, the same constitutions as those in FIG. 12 described above are denoted by the same reference numbers, and descriptions thereof will be omitted.

The control signal generator 78*b*-1 outputs the control signals GS11 to GS16 of the inverter 5-1, based on the first DC voltage Vdc1*s*, and the voltage $V_{u1}$, the voltage $V_{v1}$, and the voltage $V_{w1}$, which are voltage command values on three-phase axes.

Note that the rotating machine control device 1*c* according to the present embodiment includes a controller 7*c*-1 of the first system, and the controller 7*c*-1 includes the control signal generator 78*b*-1.

The duty arithmetic unit 781*b*-1 outputs first duties (du1, dv1, dw1) that are values obtained by respectively normalizing by use of the first DC voltage Vdc1*s*, based on the voltage $V_{u1}$, the voltage $V_{v1}$, and the voltage $V_{w1}$. The duty arithmetic unit 781*b*-1 includes a zero-phase voltage arithmetic unit 80*a*-1, a multiplier 81-1, an adder 82-1, a multiplier 83-1, an adder 84-1, a multiplier 85-1, an adder 86-1, a subtractor 87-1, a subtractor 88-1, and a subtractor 89-1. Note that the duty arithmetic unit 781*b*-1 is different from the duty arithmetic unit 781*a*-1 in the third embodiment in that the zero-phase voltage arithmetic unit 80a-1 is included, instead of the zero-phase voltage arithmetic unit 80-1.

The zero-phase voltage arithmetic unit 80a-1 calculates a zero-phase voltage $V_{0a}$, based on the voltage $V_{u1}$, the voltage $V_{v1}$, and the voltage $V_{w1}$, which are voltage command values, and the detected voltage Vdc1s of the own system. The zero-phase voltage arithmetic unit 80a-1 calculates the zero-phase voltage $V_{0a}$, by use of, for example, the following equation (38). Note that the zero-phase voltage arithmetic unit 80a-1 calculates the zero-phase voltage $V_{0a}$ of the own system so that the maximum value of the own system voltage commands (the voltage $V_{u1}$, the voltage $V_{v1}$, and the voltage $V_{w1}$) matches a predetermined upper limit value (for example, Vdc1s) based on the DC voltage Vdc1s of the own system.

[Equation 38]

$$V_{0a} = V_{max} - \frac{Vdc1s}{2} \quad (38)$$

Here, a maximum voltage $V_{max}$ is the maximum value of the voltage $V_{u1}$, the voltage $V_{v1}$, and the voltage $V_{w1}$ at the time of calculating the zero-phase voltage $V_{0a}$.

The zero-phase voltage arithmetic unit 80a-1 calculates the zero-phase voltage $V_{0a}$ of the own system by subtracting a value of ½ (Vdc1s/2) of the DC voltage Vdc1s of the own system from the maximum voltage $V_{max}$ so that the maximum one (the maximum voltage $V_{max}$) of the own system voltage commands (the voltage $V_{u1}$, the voltage $V_{v1}$, and the voltage $V_{w1}$) matches a predetermined upper limit value (for example, Vdc1s) based on the DC voltage Vdc1s of the own system.

Since the constitutions on subsequent stages of the subtractor 87-1, the subtractor 88-1, and the subtractor 89-1 are similar to those in the third embodiment, descriptions thereof will be omitted here.

Next, a constitution of the control signal generator 78b-2 of the second system will be described with reference to FIG. 17.

Figure 17:
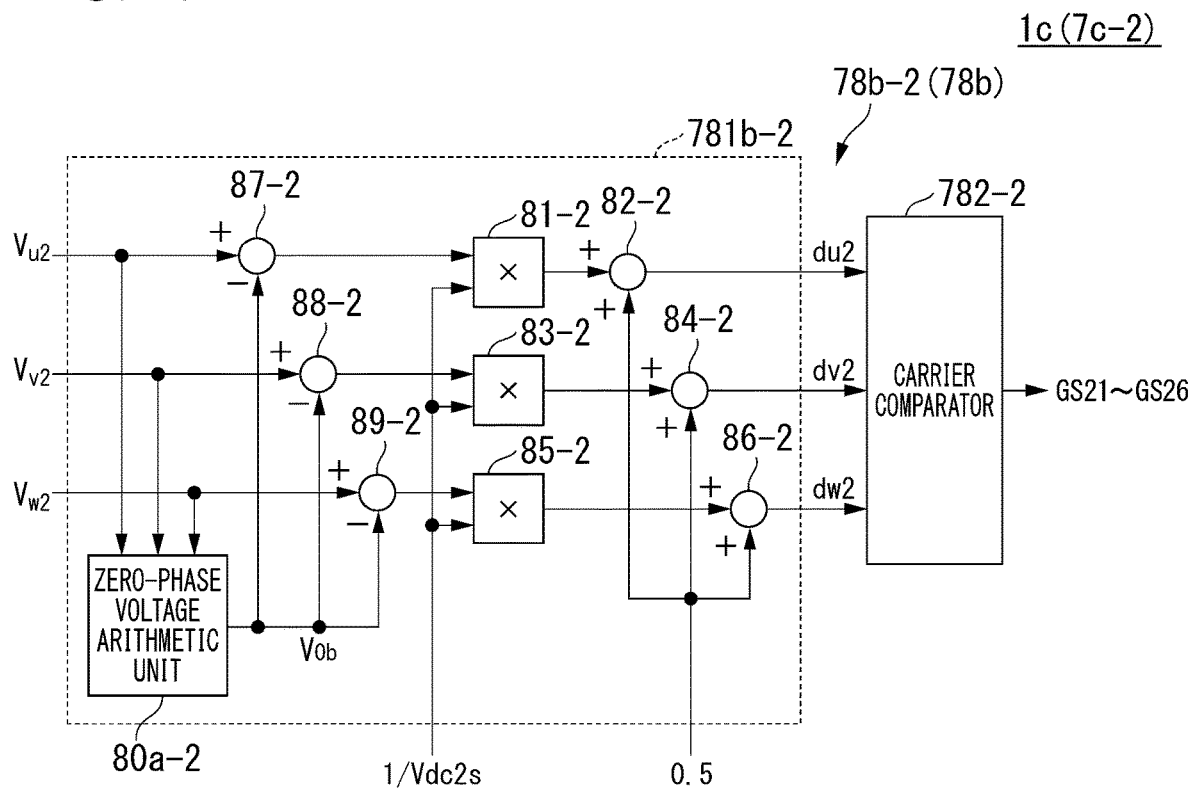
FIG. 17 is a block diagram illustrating an example of a control signal generator in a second system in the fourth embodiment.

FIG. 17 is a block diagram illustrating an example of the control signal generator 78b-1 of the second system in the present embodiment.

As illustrated in FIG. 17, the control signal generator 78b-2 includes a duty arithmetic unit 781b-2 and a carrier comparator 782-2.

The control signal generator 78b-2 outputs the control signals GS21 to GS26 of the inverter 5-2, based on the second DC voltage Vdc2s, and the voltage $V_{u2}$, the voltage $V_{v2}$, and the voltage $V_{w2}$, which are voltage command values on three-phase axes.

Note that the rotating machine control device 1c according to the present embodiment includes a controller 7c-2 of the second system, and the controller 7c-2 includes the control signal generator 78b-2.

The duty arithmetic unit 781b-2 outputs second duties (du2, dv2, dw2) that are values obtained by respectively normalizing by use of the second DC voltage Vdc2s, based on the voltage $V_{u2}$, the voltage $V_{v2}$, and the voltage $V_{w2}$. The duty arithmetic unit 781b-2 includes a zero-phase voltage arithmetic unit 80a-2, a multiplier 81-2, an adder 82-2, a multiplier 83-2, an adder 84-2, a multiplier 85-2, an adder 86-2, a subtractor 87-2, a subtractor 88-2, and a subtractor 89-2. Note that the duty arithmetic unit 781b-2 is different from the duty arithmetic unit 781a-2 in the third embodiment in that the zero-phase voltage arithmetic unit 80a-2 is included, instead of the zero-phase voltage arithmetic unit 80-2.

The zero-phase voltage arithmetic unit 80a-2 calculates the zero-phase voltage $V_{0b}$, based on the voltage $V_{u2}$, the voltage $V_{v2}$, and the voltage $V_{w2}$, which are voltage command values, and the detected voltage Vdc2s of the own system. The zero-phase voltage arithmetic unit 80a-2 calculates the zero-phase voltage $V_{0b}$, by use of, for example, the following equation (39). Note that the zero-phase voltage arithmetic unit 80a-2 calculates the zero-phase voltage $V_{0b}$ of the own system so that the maximum value of the own system voltage commands (the voltage $V_{u2}$, the voltage $V_{v2}$, and the voltage $V_{w2}$) matches a predetermined upper limit value (for example, Vdc2s) based on the DC voltage Vdc2s of the own system.

[Equation 39]

$$V_{0b} = V_{max} - \frac{Vdc2s}{2} \quad (39)$$

Here, the maximum voltage $V_{max}$ is a maximum value of the voltage $V_{u2}$, the voltage $V_{v2}$, and the voltage $V_{w2}$ at the time of calculating the zero-phase voltage $V_{0b}$.

The zero-phase voltage arithmetic unit 80a-2 calculates the zero-phase voltage $V_{0b}$ of the own system by adding a value of ½ (Vdc2s/2) of the DC voltage Vdc2s of the own system to the maximum voltage $V_{max}$ so that the maximum one (the maximum voltage $V_{max}$) of the own system voltage commands (the voltage $V_{u2}$, the voltage $V_{v2}$, and the voltage $V_{w2}$) matches a predetermined lower limit value (for example, Vdc2s) based on the DC voltage Vdc2s of the own system.

Since the constitutions on subsequent stages of the subtractor 87-2, the subtractor 88-2, and the subtractor 89-2 are similar to those in the third embodiment, descriptions thereof will be omitted here.

Next, actions and effects of the rotating machine control device 1c according to the present embodiment will be described.

In the rotating machine control device 1c according to the present embodiment, the duty arithmetic unit 781b-1 and the duty arithmetic unit 781b-2 respectively calculate the zero-phase voltages ($V_{0a}$, $V_{0b}$) in the equations (38) and (39) by use of the detected voltages (Vdc1s, Vdc2s) of their own systems, and subtract the zero-phase voltage from the voltage command value to shift up the duty value within the range in which the voltage is not saturated. Note that, in the description here, since the controller 7c-1 of the first system and the controller 7c-2 of the second system have an identical constitution, "−1" and "−2" of reference numbers indicating the respective systems, suffixes "1" and "2", and [a] and [b] at the zero-phase voltage will be omitted.

In a case where it is assumed that a voltage Vdc' is the detected voltage at the time of calculating the zero-phase voltage $V_0$, the zero-phase voltage $V_0$ is expressed in the following equation (40).

[Equation 40]

$$V_0 = V_{max} - \frac{Vdc'}{2} \quad (40)$$

In addition, new voltage command values ($V_u'$, $V_v'$, $V_w'$), which are obtained by subtracting the zero-phase voltage $V_0$ expressed in the equation (40) from the voltage command values ($V_u$, $V_v$, $V_w$), are expressed in the following equation (41).

[Equation 41]

$$V_u' = V_u - V_0 = V_u - \left(V_{max} - \frac{Vdc'}{2}\right) \\ V_v' = V_v - V_0 = V_v - \left(V_{max} - \frac{Vdc'}{2}\right) \\ V_w' = V_w - V_0 = V_w - \left(V_{max} - \frac{Vdc'}{2}\right) \tag{41}$$

Here, it is assumed that the voltage command value $V_w$ of the voltage command values ($V_u$, $V_v$, $V_w$) is the maximum value, the maximum value $V_{max}$ is the voltage command value $V_w$. Therefore, the new voltage command value $V_w'$ is expressed in the following equation (42).

[Equation 42]

$$V_w' = V_{max} - \left(V_{max} - \frac{Vdc'}{2}\right) = \frac{Vdc'}{2} \tag{42}$$

Next, in a case where the new voltage command value $V_w'$ is used, the duty dw' is expressed in the following equation (43).

[Equation 43]

$$dw' = \frac{V_w'}{Vdc} + 0.5 = \frac{\frac{Vdc'}{2}}{Vdc} + 0.5 \tag{43}$$

Here, in a case where the detected voltage Vdc' using the value on the other system side is not equal to the DC voltage Vdc (Vdc'≠Vdc), the duty dw' is expressed in the following equation (44). In consideration of the duties of the other phases in a similar manner, the duties of the respective phases have waveforms as illustrated in FIG. 18.

[Equation 44]

$$dw' = \frac{1}{2}\left(\frac{Vdc'}{Vdc}\right) + 0.5 \ne 1 \tag{44}$$

Figure 18:
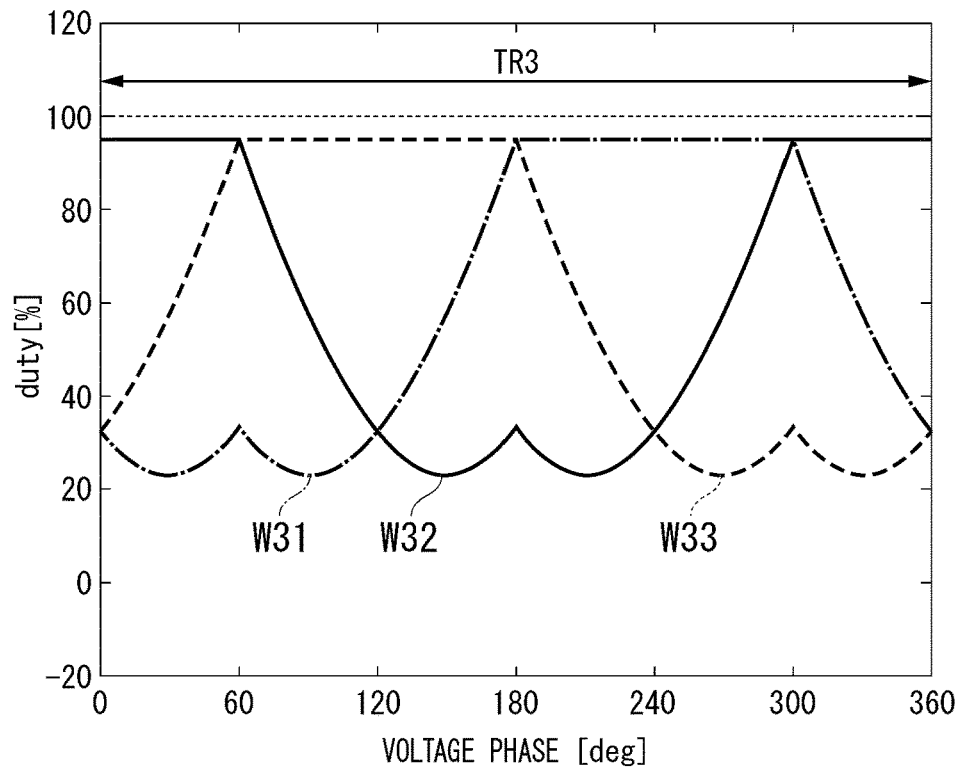
FIG. 18 is a diagram illustrating duty waveforms of the respective phases, in a case where a detected voltage of the other system is used in the fourth embodiment.

FIG. 18 is a diagram illustrating duty waveforms of the respective phases, in a case where a detected voltage of the other system is used in the present embodiment.

In FIG. 18, in the graph, the horizontal axis represents a voltage phase and the vertical axis represents duty. In addition, a waveform W31, a waveform W32, and a waveform W33 respectively represent a U-phase duty waveform, a V-phase duty waveform, and a W-phase duty waveform. In addition, a period TR3 represents a period of three-phase switching all the time.

As illustrated in FIG. 18, in a case where the detected voltage Vdc' uses a value on the other system side, the controller 7c conducts control of performing the three-phase switching all the time.

Figure 19:
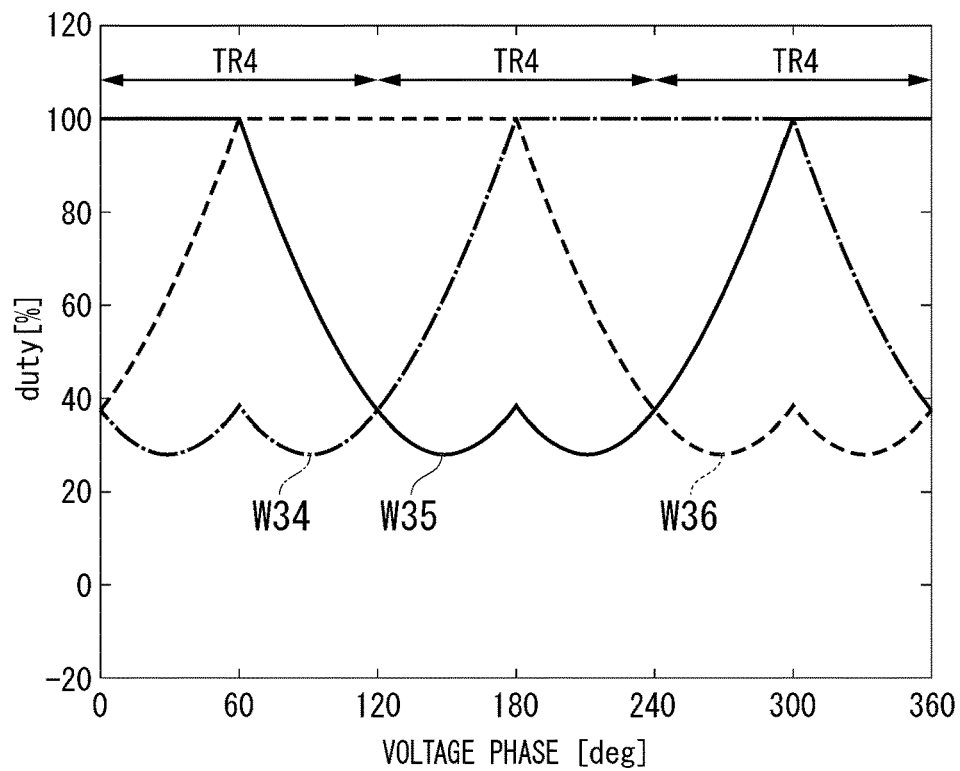
FIG. 19 is a diagram illustrating duty waveforms of the respective phases, in a case where a detected voltage of the own system is used in the fourth embodiment.

Next, in a case where the detected voltage Vdc' using the value on the own system side is equal to the DC voltage Vdc (Vdc'=Vdc), the duty dw' is expressed in the following equation (45). In consideration of the duties of the other phases in a similar manner, the duties of the respective phases have waveforms as illustrated in FIG. 19.

[Equation 45]

$$dw' = \frac{1}{2} + 0.5 = 1 \tag{45}$$

As expressed in the equation (45), the maximum one of the duties of three phases is always equal to "1". Thus, in such a phase, the switching element on a lower arm side (low potential side) is always in ON state.

FIG. 19 is a diagram illustrating duty waveforms of the respective phases, in a case where a detected voltage of the own system is used in the present embodiment.

In FIG. 19, in the graph, the horizontal axis represents voltage phase and the vertical axis represents duty. In addition, a waveform W34, a waveform W35, and a waveform W36 respectively represent a U-phase duty waveform, a V-phase duty waveform, and a W-phase duty waveform. In addition, a period TR4 represents a period of two-phase switching all the time.

As illustrated in FIG. 19, in the case where a value on the own system side is used for the detected voltage Vdc', the controller 7c conducts control of performing the two-phase switching all the time. That is, the rotating machine control device 1c according to the present embodiment performs the two-phase switching all the time, by use of the detected voltage Vdc of the own system at the time of calculating the zero-phase voltage $V_0$. Accordingly, the rotating machine control device 1c according to the present embodiment is capable of reducing a switching loss and improving the electric current detection accuracy, as compared with the case of using the detected voltage of the other system.

As described heretofore, in the rotating machine control device 1c according to the present embodiment, the controller 7c calculates the zero-phase voltages ($V_{0a}$, $V_{0b}$) of the own system, based on the DC voltage of the own system, and corrects the own system voltage command of each phase, based on the zero-phase voltages ($V_{0a}$, $V_{0b}$) of the own system.

Accordingly, in the rotating machine control device 1c according to the present embodiment, two-phase modulation (the two-phase switching all the time) can be performed, and the influence of noise in the electric current detection can be reduced.

In the present embodiment, the controller 7c calculates the zero-phase voltage of the own system so that the maximum one of the own system voltage commands matches a predetermined upper limit value based on the DC voltage of the own system.

Accordingly, the rotating machine control device 1c according to the present embodiment is capable of appropriately shifting up the duty value within the range in which the voltage is not saturated.

Fifth Embodiment

Next, an electric power steering device 100 according to a fifth embodiment will be described with reference to the drawings.

Figure 20:
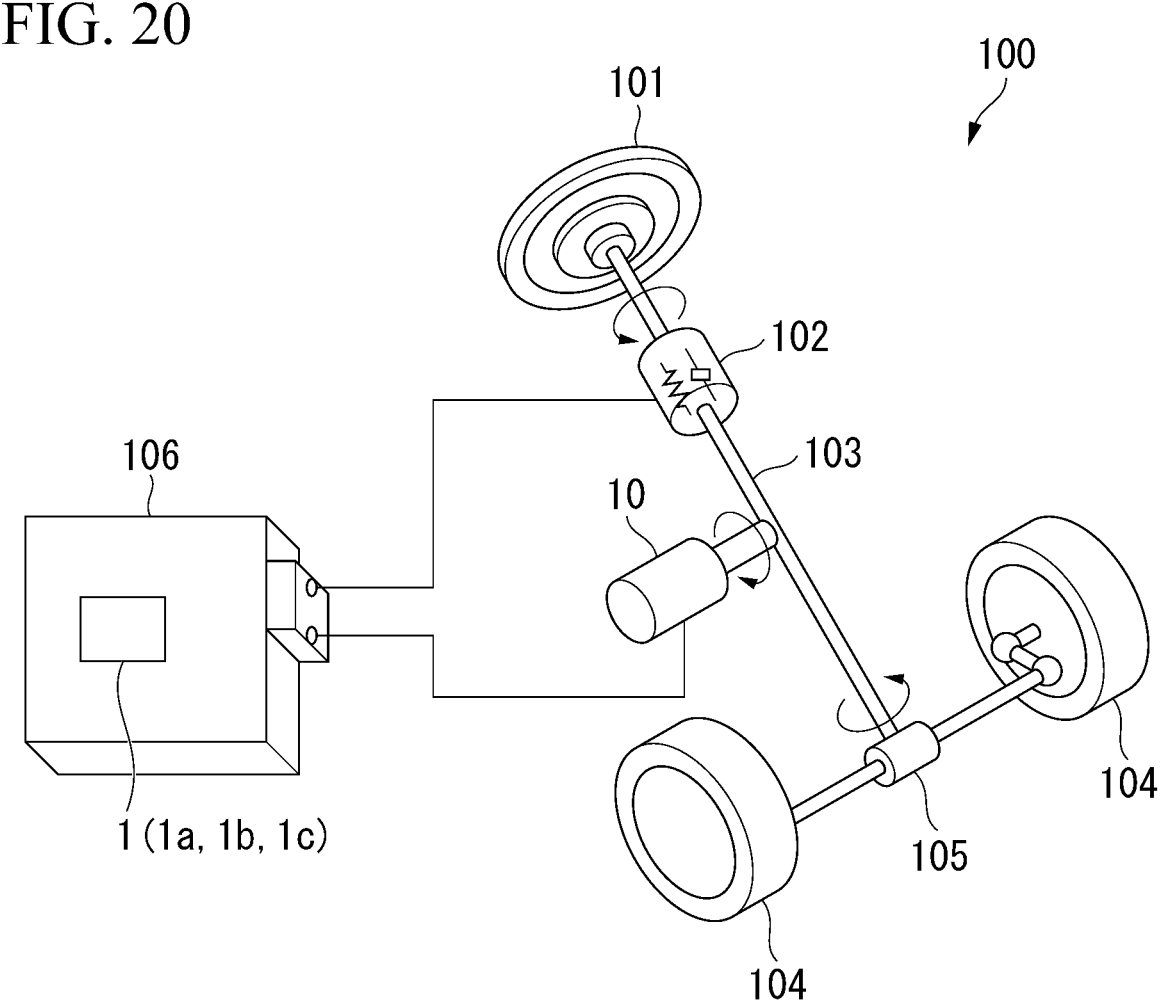
FIG. 20 is a block diagram illustrating an example of an electric power steering device according to a fifth embodiment.

FIG. 20 is a block diagram illustrating an example of the electric power steering device 100 according to the fifth embodiment.

As illustrated in FIG. 20, the electric power steering device 100 includes the rotating machine 10, a steering wheel 101, a torque sensor 102, a steering shaft 103, wheels 104, a rack and pinion gear 105, and a control device 106. In addition, the control device 106 includes the above-described rotating machine control device 1 (1a, 1b, 1c).

The torque sensor 102 detects steering torque of a driver (not illustrated).

The wheels 104 are, for example, wheels to be steered on a vehicle such as an automobile.

In the electric power steering device 100, the steering torque applied from the driver to the steering wheel 101 is transmitted through a torsion bar of the torque sensor 102 and the steering shaft 103 to a rack via the rack and pinion gear 105. Accordingly, the electric power steering device 100 steers the wheels 104.

In addition, the rotating machine 10 is driven by the rotating machine control device 1 (1a, 1b, 1c) of the control device 106, and generates assist force as an output. The assist force is transmitted to the steering shaft 103 to reduce the steering torque applied by the driver during steering. The control device 106 calculates an assist command for adjusting the assist force, based on the steering torque of the driver that has been detected by the torque sensor 102. For example, the control device 106 calculates the assist command as a value proportional to the steering torque of the driver. Furthermore, the control device 106 sets an assist command as a torque command to be a command value of the rotating machine 10.

As described heretofore, the electric power steering device 100 according to the present embodiment includes the above-described rotating machine control device 1 (1a, 1b, 1c), the rotating machine 10, which assists steering, and the torque sensor 102, which detects steering torque in the steering. The rotating machine control device 1 (1a, 1b, 1c) controls the rotating machine 10 with a steering assist command in accordance with the steering torque that has been detected by the torque sensor 102, as a command value of the rotating machine 10.

Accordingly, the electric power steering device 100 according to the present embodiment has similar effects to those of the above-described rotating machine control device 1 (1a, 1b, 1c). Even in a case where a difference occurs between the DC voltages output from the DC power supplies (3-1, 3-2) of the plurality of systems that control the rotating machine 10, the mismatch between the systems can be reduced. In addition, the electric power steering device 100 according to the present embodiment is capable of obtaining the assist torque in accordance with the steering of the driver from the rotating machine 10, and in addition, is capable of stably controlling the rotating machine 10 with the electric currents in two systems, so that the electric power steering device that enables comfortable steering is achievable.

Note that the present disclosure is not limited to the above embodiments, and can be modified without departing from the gist of the present disclosure.

For example, in each of the above embodiments, the description has been given with regard to an example in which the electric current command value of the electric current to flow to the rotating machine 10 is used as the control target value (the command value), but there is no intention to be limited to this. For example, in conducting V/F control on the rotating machine 10, the control target value is a speed command value of the rotating machine 10, and in controlling the rotational position of the rotating machine 10, the control target value is a position command value of the rotating machine 10.

In addition, in each of the above embodiments, the description has been given with regard to an example in which the electric current command arithmetic unit 70-1 generates the electric current command values (Id_target1, Iq_target1) from the command signal Ts1 of the rotating machine 10, and the electric current command arithmetic unit 70-2 generates the electric current command values (Id_target2, Iq_target2) from the command signal Ts2 of the rotating machine 10, but there is no intention to be limited to this. For example, an identical command signal Ts may be input into the electric current command arithmetic unit 70-1 and the electric current command arithmetic unit 70-2.

Further, the controllers 7 (7a, 7b, 7c) in either one of two systems may include the electric current command arithmetic unit 70, and the electric current command values (Id_target, Iq_target) that have been generated by the electric current command arithmetic unit 70 of one of the systems may be used by the controllers 7 (7a, 7b, 7c) in two systems. In addition, a third controller including the electric current command arithmetic unit 70 for generating the electric current command values (Id_target, Iq_target) may be provided, and the electric current command values (Id_target, Iq_target) that have been generated by the electric current command arithmetic unit 70 of the third controller may be used by the controllers 7 (7a, 7b, 7c) in the two systems.

Further, in each of the above embodiments, the electric current command arithmetic unit 70-1 may generate the d-axis electric current command value Id_target1 and the q-axis electric current command value Iq_target1, based on the DC voltage minimum value Vdc_min, which is the lower one of the first DC voltage Vdc1 (=Vdc1s) and the second DC voltage Vdc2 (=Vdc2s), and the command value of the rotating machine 10. In addition, the electric current command arithmetic unit 70-2 may generate the d-axis electric current command value Id_target2 and the q-axis electric current command value Iq_target2, based on the DC voltage minimum value Vdc_min and the command value of the rotating machine 10.

Further, in each of the above embodiments, the description has been given with regard to an example in which the controller 7-1 (7a-1, 7b-1, 7c-1) of the first system and the controller 7-2 (7a-2, 7b 2, 7c-2) of the second system each include a CPU, but there is no intention to be limited to this. Both the controller 7-1 (7a-1, 7b-1, 7c-1) and the controller 7-2 (7a-2, 7b 2, 7c-2) may be controlled by one CPU. In this case, one CPU takes in the first DC voltage Vdc1s and the second DC voltage Vdc2s, and performs arithmetic operations of the controller 7-1 (7a-1, 7b-1, 7c-1) and the controller 7-2 (7a-2, 7b-2, 7c-2).

In addition, each of the above embodiments has been described as a single embodiment, but there is no intention of being limited to this, and may be implemented by combining some or all of the embodiments.

Note that each constitution included in the above-described rotating machine control device 1 (1a, 1b, 1c) includes a computer system in its inside. Then, a program for implementing functions of each constitution included in the above-described rotating machine control device 1 (1a, 1b, 1c) may be recorded in a computer-readable recording medium, and processing in each constitution included in the rotating machine control device 1 (1a, 1b, 1c) described above may be performed by causing a computer system to read and execute the program recorded in the recording medium. Here, "causing a computer system to read and execute the program recorded in the recording medium"

includes installing the program in the computer system. The "computer system" herein includes an OS and hardware such as peripheral devices.

In addition, the "computer system" may include a plurality of computer devices connected through a network including a communication line such as the Internet, a WAN, a LAN, or a dedicated line. Further, the "computer-readable recording medium" denotes a portable medium such as a flexible disk, a magneto-optical disk, a ROM, or a CD-ROM, or a storage device such as a hard disk built in a computer system. In this manner, the recording medium storing the program may be a non-transitory recording medium such as a CD-ROM.

In addition, the recording medium also includes a recording medium provided internally or externally that can be accessed from a distribution server so as to distribute the program. Note that a constitution in which the program is divided into a plurality of pieces, which are downloaded at different timings and are then combined with each constitution included in the rotating machine control device 1 (1$a$, 1$b$, 1$c$), or different distribution servers for respectively distributing the divided programs may be provided. Furthermore, the "computer-readable recording medium" includes a medium that holds a program for a certain period of time, such as a volatile memory (RAM) inside a computer system that serves as a server or a client when the program is transmitted through a network. In addition, the program may be for implementing a part of the above-described functions. Furthermore, the above-described functions may be implemented by a combination with a program already recorded in a computer system, that is, a so-called differential file (differential program).

REFERENCE SIGNS LIST 1, 1$a$, 1$b$, 1$c$ Rotating machine control device
2 Position detector
3-1, 3-2 DC power supply
4-1, 4-2 Capacitor
5-1, 5-2 Inverter
6-1, 6-2 Electric current detector
7, 7-1, 7-2, 7$a$, 7$a$-1, 7$a$-2, 7$b$, 7$b$-1, 7$b$-2, 7$c$, 7$c$-1, 7$c$-2 Controller
10 Rotating machine
51-1, 51-2, 52-1, 52-2, 53-1, 53-2, 54-1, 54-2, 55-1, 56-2 Switching element
60, 60-1, 60-2 Voltage minimum value calculator
61, 61-1, 61-2 Own system battery electric current arithmetic unit
62, 62-1, 62-2 Other system battery electric current arithmetic unit
63, 63-1, 63-2 Voltage deviation calculator
70-1, 70-2 Electric current command arithmetic unit
71-1, 71-2, 73-1, 73-2 Subtractor
72-1, 72-2, 74-1, 74-2 Electric current controller
75-1, 75-2, 77-1, 77-2 Coordinate converter
76-1, 76-2 MIN selector
78, 78-1, 78-2, 78$a$, 78$a$-1, 78$a$-2, 78$b$, 78$b$-1, 78$b$-2 Control signal generator
80-1, 80-2, 80$a$-1, 80$a$-2 Zero-phase voltage arithmetic unit
81-1, 83-1, 85-2 Multiplier
82-1, 84-1, 86-1, 722-1, 742-1 Adder
100 Electric power steering device
101 Steering wheel
102 Torque sensor
103 Steering shaft
104 Wheel
105 Rack and pinion gear
106 Control device
721-1, 723-1, 741-1, 743-1 Amplifier
724-1, 744-1 Integrator
725-1, 745-1 Limiter
781-1, 781$a$-1, 781$a$-2, 781$b$-1, 781$b$-2 Duty arithmetic unit
782-1, 782-2 Carrier comparator

The invention claimed is:

1. A rotating machine control device comprising:
a first inverter that applies an alternating-current voltage to three-phase windings of a first system included in a rotating machine, based on a first direct-current voltage that has been output from a direct-current power supply of the first system;
a second inverter that applies an alternating-current voltage to three-phase windings of a second system included in the rotating machine, based on a second direct-current voltage that has been output from a direct-current power supply of the second system;
a first controller that generates a command value to the first inverter, based on a command value of the rotating machine, the first direct-current voltage, and the second direct-current voltage; and
a second controller that generates a command value to the second inverter, based on the command value of the rotating machine, the first direct-current voltage, and the second direct-current voltage, wherein
the first controller and the second controller each limit an own system voltage command related to a voltage to be applied to the three-phase windings of an own system by use of a direct-current voltage of an other system, in a case where a direct-current voltage of the own system is higher than the direct-current voltage of the other system, and also generate a value obtained by normalizing the own system voltage command by use of the direct-current voltage of the own system, as a command value to an inverter of the own system.

2. The rotating machine control device according to claim 1, wherein
the first controller and the second controller each
calculate a zero-phase voltage of the own system, based on the direct-current voltage of the own system, and correct the own system voltage command of each phase, based on the zero-phase voltage of the own system.

3. The rotating machine control device according to claim 2, wherein
the first controller and the second controller each calculate the zero-phase voltage of the own system for a minimum one of the own system voltage command to match a predetermined lower limit value based on the direct-current voltage of the own system.

4. The rotating machine control device according to claim 2, wherein
the first controller and the second controller each
calculate the zero-phase voltage of the own system for a maximum one of the own system voltage command to match a predetermined upper limit value based on the direct-current voltage of the own system.

5. The rotating machine control device according to claim 1, wherein
the first controller and the second controller each limit the own system voltage command, based on a voltage deviation, in a case where the direct-current voltage of the own system is higher than the direct-current voltage of the other system, the voltage deviation being a value obtained in such a manner that out of a direct-current part electric current of the first system that is an electric current of a direct-current part to flow into the first inverter and a direct-current part electric current of the second system that is an electric current of a direct-current part to flow into the second inverter, the direct-current part electric current of the own system is subtracted from the direct-current part electric current of the other system and a subtraction result is multiplied by a wiring resistance indicating a resistance of wiring through that the direct-current part electric current of the own system flows.

6. The rotating machine control device according to claim 5, wherein
the first controller and the second controller each calculate the direct-current part electric current of the other system, based on the direct-current voltage of the other system.

7. The rotating machine control device according to claim 5, wherein
the first controller and the second controller each calculate the direct-current part electric current of the other system, based on the direct-current voltage of the own system, the direct-current voltage of the other system, and a direct current of the own system.

8. The rotating machine control device according to claim 5, further comprising
an electric current detector that detects electric currents that respectively flow through three-phase windings of each system, wherein
the first controller and the second controller each calculate a direct current of the own system, based on the electric currents that respectively flow through the three-phase windings of the own system that have been detected by the electric current detector.

9. The rotating machine control device according to claim 1, wherein
the first controller comprises a first central processing unit (CPU),
the second controller comprises a second CPU,
the first CPU transmits the first direct-current voltage to the second CPU, and
the second CPU transmits the second direct-current voltage to the first CPU.

10. The rotating machine control device according to claim 1, wherein
the first controller and the second controller each limit a voltage command on dq-axes, out of own system voltage commands, by use of the direct-current voltage of the other system, in a case where the direct-current voltage of the own system is higher than the direct-current voltage of the other system.

11. The rotating machine control device according to claim 1, wherein
the first controller and the second controller each limit a magnitude of a voltage command vector on a stationary coordinate axis, out of own system voltage commands, to a value that the direct-current voltage of the other system is capable of outputting, in a case where the direct-current voltage of the own system is higher than the direct-current voltage of the other system.

12. An electric power steering device comprising:
the rotating machine control device of claim 1;
the rotating machine that assists steering in steering; and
a torque sensor that detects steering torque in the steering, wherein
the rotating machine control device controls the rotating machine with an assist command of the steering in accordance with the steering torque that has been detected by the torque sensor, as a command value of the rotating machine.

* * * * *